United States Patent
Or et al.

(10) Patent No.: US 10,649,868 B2
(45) Date of Patent: May 12, 2020

(54) MULTIPLE POINTS IN TIME DISK IMAGES FOR DISASTER RECOVERY

(71) Applicant: Zerto Ltd., Herzliya (IL)

(72) Inventors: Tomer Ben Or, Givat Haim Ichud (IL); Gil Barash, Tel Aviv (IL); Chen Burshan, Tel Aviv (IL); Ziv Kedem, Tel Aviv (IL)

(73) Assignee: Zerto Ltd., Herzilya (IL)

( * ) Notice: Subject to any disclaimer, the term of this patent is extended or adjusted under 35 U.S.C. 154(b) by 0 days.

(21) Appl. No.: 15/194,097

(22) Filed: Jun. 27, 2016

(65) Prior Publication Data

US 2016/0357652 A1 Dec. 8, 2016

Related U.S. Application Data

(60) Division of application No. 13/367,456, filed on Feb. 7, 2012, now Pat. No. 9,389,892, which is a
(Continued)

(51) Int. Cl.
*G06F 11/00* (2006.01)
*G06F 11/263* (2006.01)
(Continued)

(52) U.S. Cl.
CPC ........ *G06F 11/263* (2013.01); *G06F 9/45533* (2013.01); *G06F 9/45558* (2013.01);
(Continued)

(58) Field of Classification Search
CPC .............. G06F 11/263; G06F 11/2094; G06F 11/2025; G06F 11/1446; G06F 11/1448;
(Continued)

(56) References Cited

U.S. PATENT DOCUMENTS 5,212,784 A 5/1993 Sparks
5,544,347 A 8/1996 Yanai et al.
(Continued)

FOREIGN PATENT DOCUMENTS

WO WO-2009/151445 12/2009

OTHER PUBLICATIONS

"Zerto Hits Triple-Digit Growth Once Againl Builds Toward a Future of Uninterrupted Technology," Zerto, Feb. 3, 2015, 2 pages.
(Continued)

*Primary Examiner* — Philip Guyton
(74) *Attorney, Agent, or Firm* — Foley & Lardner LLP; James De Vellis

(57) ABSTRACT

An enterprise disaster recovery system, including at least one data disk, a processor for running at least one data application that reads data from the at least one data disk and writes data to the at least one data disk over a period of time, a recovery test engine that (i) generates in parallel a plurality of processing stacks corresponding to a respective plurality of previous points in time within the period of time, each stack operative to process a command to read data at a designated address from a designated one of the at least one data disk and return data at the designated address in an image of the designated data disk at the previous point in time corresponding to the stack, and (ii) that generates in parallel a plurality of logs of commands issued by the at least one data application to write data into designated addresses of designated ones of the plurality of data disks, each log corresponding to a respective previous point in time, wherein the plurality of previous points in time within the period of time are specified arbitrarily by a user of the system.

20 Claims, 20 Drawing Sheets

Related U.S. Application Data continuation-in-part of application No. 13/175,898, filed on Jul. 4, 2011, now Pat. No. 9,710,294, which is a continuation-in-part of application No. 13/039,446, filed on Mar. 3, 2011.

(60) Provisional application No. 61/314,589, filed on Mar. 17, 2010.

(51) Int. Cl.
*G06F 9/455* (2018.01)
*G06F 11/20* (2006.01)
*G06F 11/22* (2006.01)

(52) U.S. Cl.
CPC ...... *G06F 11/2094* (2013.01); *G06F 11/2205* (2013.01); *G06F 2009/45579* (2013.01); *G06F 2009/45583* (2013.01)

(58) Field of Classification Search
CPC ............. G06F 11/1451; G06F 11/1458; G06F 11/3688
See application file for complete search history.

(56) References Cited

U.S. PATENT DOCUMENTS

| | | |
|---|---|---|
| 5,649,152 A | 7/1997 | Ohran et al. |
| 5,664,186 A | 9/1997 | Bennett et al. |
| 5,835,953 A | 11/1998 | Ohran |
| 5,933,653 A | 8/1999 | Ofek |
| 5,935,260 A | 8/1999 | Ofer |
| 5,991,813 A | 11/1999 | Zarrow |
| 6,073,209 A | 6/2000 | Bergsten |
| 6,073,222 A | 6/2000 | Ohran |
| 6,658,591 B1 | 12/2003 | Arndt |
| 6,910,160 B2 | 6/2005 | Bajoria et al. |
| 6,944,847 B2 | 9/2005 | Desai et al. |
| 7,063,395 B2 | 6/2006 | Gagne et al. |
| 7,143,307 B1 | 11/2006 | Witte et al. |
| 7,325,159 B2 | 1/2008 | Stager et al. |
| 7,421,617 B2 | 9/2008 | Anderson et al. |
| 7,464,126 B2 | 12/2008 | Chen |
| 7,475,207 B2 | 1/2009 | Bromling et al. |
| 7,516,287 B2 | 4/2009 | Ahal et al. |
| 7,523,277 B1 | 4/2009 | Kekre et al. |
| 7,557,867 B2 | 7/2009 | Goo |
| 7,577,817 B2 | 8/2009 | Karpoff et al. |
| 7,577,867 B2 | 8/2009 | Lewin et al. |
| 7,603,395 B1 | 10/2009 | Bingham et al. |
| 7,647,460 B1 | 1/2010 | Wilson et al. |
| 7,720,817 B2 | 5/2010 | Stager et al. |
| 7,765,433 B1 | 7/2010 | Krishnamurthy |
| 7,791,091 B2 | 9/2010 | Nagai |
| 7,849,361 B2 | 12/2010 | Ahal et al. |
| 7,865,893 B1 | 1/2011 | Omelyanchuk et al. |
| 7,971,091 B1 | 6/2011 | Bingham et al. |
| 8,020,037 B1* | 9/2011 | Schwartz ............ G06F 11/2094 714/41 |
| 8,156,301 B1 | 4/2012 | Khandelwal et al. |
| 8,296,419 B1 | 10/2012 | Khanna et al. |
| 8,352,941 B1 | 1/2013 | Protopopov et al. |
| 8,650,299 B1 | 2/2014 | Huang et al. |
| 2003/0149910 A1* | 8/2003 | Qin .................... G06F 11/1469 714/15 |
| 2004/0068561 A1 | 4/2004 | Yamamoto et al. |
| 2004/0153639 A1 | 8/2004 | Cherian et al. |
| 2005/0071588 A1 | 3/2005 | Spear et al. |
| 2005/0171979 A1 | 8/2005 | Stager et al. |
| 2005/0182953 A1 | 8/2005 | Stager et al. |
| 2005/0188256 A1 | 8/2005 | Stager et al. |
| 2006/0047996 A1 | 3/2006 | Anderson et al. |
| 2006/0048002 A1* | 3/2006 | Kodi ................... G06F 11/1448 714/13 |
| 2006/0112222 A1 | 5/2006 | Barrall |
| 2006/0129562 A1 | 6/2006 | Pulamarasetti et al. |
| 2006/0161394 A1 | 7/2006 | Dulberg et al. |
| 2007/0028244 A1 | 2/2007 | Landis et al. |
| 2007/0112772 A1 | 5/2007 | Morgan et al. |
| 2007/0162513 A1 | 7/2007 | Lewin et al. |
| 2007/0220311 A1 | 9/2007 | Lewin et al. |
| 2008/0086726 A1 | 4/2008 | Griffith et al. |
| 2008/0177963 A1 | 7/2008 | Rogers |
| 2008/0195624 A1 | 8/2008 | Ponnappan et al. |
| 2008/0208555 A1* | 8/2008 | Tatsuoka ................ G06F 11/36 703/15 |
| 2009/0150510 A1 | 6/2009 | Kovacs et al. |
| 2009/0187776 A1 | 7/2009 | Baba et al. |
| 2009/0249330 A1 | 10/2009 | Abercrombie et al. |
| 2009/0283851 A1 | 11/2009 | Chen |
| 2009/0307396 A1 | 12/2009 | Nogueras et al. |
| 2010/0017801 A1 | 1/2010 | Kundapur |
| 2010/0027552 A1 | 2/2010 | Hill |
| 2010/0058335 A1 | 3/2010 | Weber |
| 2010/0150341 A1 | 6/2010 | Dodgson et al. |
| 2010/0175064 A1 | 7/2010 | Brahmaroutu |
| 2010/0198972 A1 | 8/2010 | Umbehocker |
| 2010/0250824 A1 | 9/2010 | Belay |
| 2010/0250892 A1 | 9/2010 | Logan et al. |
| 2010/0274886 A1 | 10/2010 | Nahum et al. |
| 2010/0274890 A1 | 10/2010 | Patel |
| 2011/0022812 A1 | 1/2011 | Van Der Linden et al. |
| 2011/0055471 A1 | 3/2011 | Thatcher et al. |
| 2011/0075674 A1 | 3/2011 | Li et al. |
| 2011/0087874 A1* | 4/2011 | Timashev ............ G06F 9/44589 713/100 |
| 2011/0099200 A1 | 4/2011 | Blount et al. |
| 2011/0099342 A1 | 4/2011 | Ozdemir |
| 2011/0107331 A1 | 5/2011 | Evans et al. |
| 2011/0125980 A1 | 5/2011 | Brunet et al. |
| 2011/0131183 A1 | 6/2011 | Chandhok et al. |
| 2011/0153569 A1 | 6/2011 | Fachan et al. |
| 2011/0161299 A1 | 6/2011 | Prahlad et al. |
| 2011/0161301 A1 | 6/2011 | Pratt et al. |
| 2011/0179341 A1 | 7/2011 | Falls et al. |
| 2011/0202734 A1* | 8/2011 | Dhakras ............... G06F 9/45533 711/162 |
| 2011/0264786 A1 | 10/2011 | Kedem et al. |
| 2012/0110086 A1 | 5/2012 | Baitinger et al. |
| 2012/0110572 A1 | 5/2012 | Kodi et al. |
| 2012/0185913 A1 | 7/2012 | Martinez et al. |
| 2013/0014104 A1 | 1/2013 | Natanzon et al. |
| 2014/0331221 A1 | 11/2014 | Dong et al. |

OTHER PUBLICATIONS

A Comparison of Hypervisor-based Replication vs. Current and Legacy BC/DR Technologies, 2012.

Amendment "B" and Response to Office Action from Prosecution History of U.S. Pat. No. 7,603,395, dated Apr. 9, 2009, (13 pages).

Amendment "E" and Response to Office Action from Prosecution History of U.S. Pat. No. 7,971,091., dated Nov. 19, 2010, (14 pages).

Amendment and Response to Office Action from Prosecution History of U.S. Pat. No. 7,647,460, dated Aug. 30, 1999(22 pages).

Answer Claim Construction Brief of Plaintiffs *EMC Corporation and EMC Israel Development Center, Ltd., EMC Corporation and EMC Israel Development Center, Ltd.*, v. *Zerto, Inc.*, Case No. 12-956(GMS), May 9, 2014, (24 pages).

Appellants' Brief Pursuant to 37 C.F.R section 1.192 from Prosecution History of U.S. Pat. No. 7,647,460., May 9, 2002, (34 pages).

Choosing A VSS Provider Veeam Backup Guide for HyperV, Mar. 18, 2015.

Complaint, *EMC Corporation and EMC Israel Development Center, Ltd.*, v. *Zerto, Inc.*, Case No.___Demand for Jury Trial, Jul. 20, 2012, (13 pages).

Data Loss Avoidance: Near Continuous Data Protection and Streamlined Disaster Recovery, www.veeaam.com.

Defendant Zerto, Inc.'s Amended Answer to the First Amended Complaint, Affirmative Defense, and Counterclaims, *EMC Corpo-*

(56) References Cited

OTHER PUBLICATIONS ration and EMC Israel Development Center, Ltd., v. Zerto, Inc., Case No. 12-956-GMS, Aug. 7, 2014, (34 pages).
Defendant Zerto, Inc.'s Claim Construction Answering Brief, *EMC Corporation and EMC Israel Development Center, Ltd., v. Zerto, Inc.*, Case No. 12-956 (GMS), May 9, 2014, (23 pages).
Defendant Zerto, Inc.'s Opening Brief in Support of its Motion for Leave to Amend its Answer to the First Amended Complaint, Affirmative Defense and Counterclaims, *EMC Corporation and EMC Israel Development Center, Ltd., v. Zerto, Inc.*, Case No. 12-956-GMS, Jun. 6, 2014, (24 pages).
Defendant Zerto, Inc.'s Opening Claim Construction Brief., *EMC Corporation and EMC Israel Development Center, Ltd., v. Zerto, Inc.*, Case No. 12-956(GMS), Apr. 11, 2014, (26 pages).
Defendant Zerto, Inc.'s Reply Brief in Support of its Motion for Leave to Amend its Answer to the First Amended Compliant, Affirmative Defense and Counterclaims, *EMC Corporation and EMC Israel Development Center, Ltd., v. Zerto, Inc.*, Case No. 12-956-GMS, Jul. 9, 2014, (16 pages).
Defendant Zerto, Inc's Motion for Judgment as a Matter of Law of No Willful Infringement of the '867 Patent . . . , Apr. 30, 2015.
Defendant's Answering Brief in Opposition to Plaintiffs' Motion to Strik and Dismiss Defendant's Affirmative Defense and Counterclaims of "Invalidity" based on Assignor Estoppel, *EMC Corporation and EMC Israel Development Center, Ltd., v. Zerto, Inc.*, Case No. 12-956(GMS), Nov. 5, 2012, (21 pages).
Deploy Hyper-V Replica, published May 31, 2012.
Double-Take Availability for vSphere: Technical Data Sheet, 2014.
EMC Corporation and EMC Israel Development Center, Ltd.'s ANswer to the Amended Counterclaims of Zerto Inc., *EMC Corporation and EMC Israel Development Center, Ltd., v. Zerto, Inc.*, Case No. 12-956-GMS, Aug. 25, 2014, (12 pages).
EMC Recoverpoint Family, 2012.
EMC Recoverpoint for Virtual Machines: Protects and Recovers VMs to Any Point in Time, 2012.
EMC's Answer Brief in Opposition to Zerto's Motion for Judgment on the Pleadings on Count III o fthe First Amended Complaint, *EMC Corporation and EMC Israel Development Center, Ltd., v. Zerto, Inc.*, Case No. 12-956-GMS, Aug. 11, 2014, (25 pages).
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, Ltd., v. Zerto, Inc.*, Case No. 12-956-GMS, Jun. 23, 2014 (25 pages).
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.
Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
Final Office Action for U.S. Appl. No. 13/039,446, dated Dec. 30, 2013.
Final Office Action on U.S. Appl. No. 13/175,892 dated Apr. 8, 2016.
Final Office Action U.S. Appl. No. 13/367,448 dated Feb. 13, 2014.
FreezeFrame User's Guide, Version 1.1, Document Version 1.1, 60 pgs, Nov. 1993.
Harper Collins, Collins English Dictionary, Third Edition Updated 1994, Section JA-258-260(3 pages).
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Illuminata EMC RecoverPoint: Beyond Basics CDP Searched via Internet on Nov. 10, 2013.
Is Synchronous Replication Enough, May 29, 2013, http://www.zerto.com/blog/general/is-synchronous-replication-enough.
Joint Appendix of Intrinsic and Dictionary Evidence, *EMC Corporation and EMC Israel Development Center, Ltd., v. Zerto, Inc.*, Case No. 12-956-GMS, May 12, 2014, (366 pages).
Joint Claim Construction Chart, *EMC Corporation and EMC Israel Development Center, Ltd., v. Zerto, Inc.*, Case No. 12-956(GMS), Mar. 21, 2014, (24 pages).
Judgment, May 21, 2015.
Letter regarding EMC's Request to File Summary Judgment Motions—Redacted, dated Feb. 13, 2015, 120 pages.
Letter to Judge Sleet re. *EMC Corporation v. Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Memorandum, *EMC Corporation and EMC Israel Development Center, Ltd., v. Zerto, Inc.*, Case No. 12-956-GMS, Jul. 31, 2014 (8 pages).
Mendocino: The RecoveryOne Solution, Architecture Guide, 22 pages Product Version 1.0, Jan. 3, 2006.
Merriam-Webster, Inc., Webster's Third New International Dictionary, Section JA-276-279 (4 pages) Copyright 2002.
Metro Mirror and Global Mirror.
Microsoft Press, Microsoft Computer Dictionary, Fifth Edition, Section JA-341-343, p. 296 (4 pages) 2002.
NetWorker PowerSnap Module for EMC Symmetrix, Release 2.1 Installation and Administrator's Guide, 238 pgs, printed Sep. 2005.
Notice of Allowance for U.S. Appl. No. 13/175,892 dated Dec. 23, 2014.
Notice of Allowance for U.S. Appl. No. 13/175,898 dated Jul. 16, 2015.
Notice of Allowance for U.S. Appl. No. 13/175,892 dated Apr. 3, 2015.
Notice of Allowance on U.S. Appl. No. 13/367,456 dated May 11, 2016.
Notification Concerning Transmittal of International Preliminary Report on Patentability dated Jan. 7, 2014 in corresponding PCT Application No. PCT/IL2012/000271, 12 pages.
Office Action for U.S. Appl. No. 13/039,446 dated Jun. 6, 2013.
Office Action for U.S. Appl. No. 13/039,446 dated Mar. 4, 2013.
Office Action for U.S. Appl. No. 13/039,446 dated Sep. 1, 2015.
Office Action for U.S. Appl. No. 13/175,892 dated Apr. 18, 2014.
Office Action for U.S. Appl. No. 13/175,892 dated Jun. 21, 2013.
Office Action for U.S. Appl. No. 13/175,898 dated Jul. 17, 2014.
Office Action for U.S. Appl. No. 13/367,448 dated Apr. 26, 2013.
Office Action for U.S. Appl. No. 13/039,446 dated Jan. 2, 2015.
Office Action for U.S. Appl. No. 13/175,898 dated Jul. 7, 2016.
Office Action on U.S. Appl. No. 13/175,892 dated Sep. 1, 2015.
Office Action on U.S. Appl. No. 13/175,898 dated Dec. 18, 2015.
Office Action on U.S. Appl. No. 13/175,898 dated Mar. 25, 2015.
Office Action on U.S. Appl. No. 13/367,448 dated Feb. 3, 2015.
Office Action on U.S. Appl. No. 13/367,456 dated Oct. 1, 2015.
Office Action on U.S. Appl. No. 14/687,341 dated Mar. 3, 2016.
Office Action on U.S. Appl. No. 14/687,341 dated Sep. 11, 2015.
Olzak, T., "Secure hypervisor-based virtual server environments", Feb. 26, 2007. http://www.techrepublic.com/blog/security/secure-hypervisor-based-virtual-server-environments/160.
Opening Brief in Support of Defendant Zerto, Inc.'s Motion for Judgment on the Pleadings on Count III of the First Amended Compliant, *EMC Corporation and EMC Israel Development Center, Ltd., v. Zerto, Inc.*, Case No. 12-956-GMS, Jul. 25, 2014, (19 pages).
Order Construing the Terms of U.S. Pat. Nos. 7,647,460; 6,073,222; 7,603,395; 7,971,091; and 7,577,867, *EMC Corporation and EMC Israel Development Center, Ltd., v. Zerto, Inc.*, Case No. 12956-GMS, Sep. 5, 2014, (0 pages).
Plaintiffs EMC Corporation and EMC Israel Development Center, Ltd.'s Opening Claim Construction Brief, *EMC Corporation and*

(56) References Cited

OTHER PUBLICATIONS

*EMC Israel Development Center, Ltd.,v. Zerto, Inc.*, Case No. 12-956(GMS), Apr. 11, 2014, (26 pages).
Plaintiff's Motion for Judgment as a Matter of Law Pursuant to Fed. R. Civ. P. 50(a), May 6, 2015.
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, Ltd.*, v. *Zerto, Inc.*, Case No. 12-956(GMS), Oct. 4, 2012, (18 pages).
Reference Model for Open Storage Systems Interconnection, Mass Storage System Reference Model Version 5, Sep. 1994 (36 pages).
ReplicateVM, Replicate VMs, not LUNS, Jul. 7, 2015, http://www.tintri.com/producs/replicatevm.
Report on the Filing or Determination of an Action Regarding a Patent or Trademark, May 22, 2015.
Revised Joint Claim Construction Chart, *EMC Corporation and EMC Israel Development Center, Ltd.*, v. *Zerto, Inc.*, Case No. 12-956(GMS), Apr. 11, 2014, (19 pages).
Revised Joint Claim Construction Chart, *EMC Corporation and EMC Israel Development Center, Ltd.*, v. *Zerto, Inc.*, Case No. 12-956(GMS), Jun. 6, 2014, (19 pages).
Scalable, High-Performance, and Cost-Effective Remote Replication on Hitachi Unified Storage and Brocade Extension Platforms, 2012, www.brocade.com.
Storage Networking Industry Association Dictionary, http://web.archive.org/web20060220153102/http://www.snia.org/education/dictionary/a, pp. JA-261-JA-273 (13 pages) 2006.
Tech Target Search.,http://searchstorage.techtarget.com/definition/storage-snapshot.html, (p. JA-274) Jul. 2005.
The Kashya KB 4000 Administrator's User Guide Product Release 2.0, 105 pgs, Aug. 2004.
The RecoveryONE Solution, Architecture Guide, Product Version 1.0, 22 pgs, Jan. 2006.
Transcript of Markman Hearing, *EMC Corporation and EMC Israel Development Center, Ltd.*, v. *Zerto, Inc.*, Case No. 12-956-GMS, Jun. 25, 2014 (94 pgs).
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
Using Double-Take Software and the Virtual Recovery Appliance, http://www.discoposse.com/index.php/category/technology/.
Veeam Backup and Replication v8, www.veeam.com.
VMware ESXi and ESX Replication for Simple Fast Disaster Recovery, http://software.dell.com/products/vreplicator/.
VMware vCenter Site Recovery Manager5 with vSphere Replication, 2011.
VMware vSphere Replication 6.0, Apr. 2015.
VReplicator Version 3.0, 2009.
Warrick, et al, "IBM Total Storage Enterprise Storage Server Implementing ESS Copy Services in Open Environments", 642 pgs, IBM Jul. 2004.
Webster's New World Dictionary, Dictionary of Computer Terms, Sixth Edition, (4 pages).
Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend the Judgment, Due to an Inconsistent Verdict, Jun. 19, 2015.
Zerto, Inc's Brief in Support of Its Renewed Motion for Judgment as a Matter of Law or, in the Alternative, for a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.
Notice of Allowance on U.S. Appl. No. 13/367,448 dated Jul. 28, 2016.
Office Action on U.S. Appl. No. 13/175,898 dated Jul. 7, 2016.
Appellant Zerto, Inc.'s Motion for Extension of Time to File its Initial Brief in the United States District Court for the District of Delaware in Case No. 1:12-cv-00956-GMS, dated May 4, 2016.
Appendix 1844, Case 2016-1856, Document 70-2, filed May 8, 2017.
Appendix 1844, Case 2016-1856, Document 71-2, filed May 9, 2017.
Corrected EMC Opening Brief, dated Sep. 16, 2016.
Corrected Non-Confidential Brief for Cross-Appellants EMC Corporation and EMC Israel Development Center Ltd, Appeals from the United States District Court for the District of Delaware in No. 1:12-cv-00956-GMS, Judge Gregory M. Sleet, dated Sep. 16, 2016.
Declaration of Allan Lipka before Patent Trial and Appeal Board, Patent Interference No. 106,070, dated Jun. 28, 2017.
Declaration of Christos Karamanolis, PH.D., Patent Interference, 106,070, dated Jun. 27, 2017.
Declaration of Ian Jestice, Patent Interference No. 106,070, dated Jul. 6, 2017.
Declaration of James Dowell before Patent Trial and Appeal Board, Patent Interference No. 106,070, dated Jun. 29, 2017.
Declaration of Jeremy Tigan in support of EMC's Renewed Motion for an Ongoing Royalty Rate Covering Post-Judgment Sales in United States District Court for Delaware case 1:12-cv-00956-GMS dated Jul. 22, 2016, Part 2 of 2.
Declaration of Jeremy Tigan in support of EMC's Renewed Motion for an Ongoing Royalty Rate Covering Post-Judgment Sales in United States District Court for Delaware case 1:12-cv-00956-GMS, dated Jul. 22, 2016, Part 1 of 2.
Declaration of John Blumenthal, dated Jul. 28, 2017.
Declaration of Matan Gilat before Patent Trial and Appeal Board, Patent Interference No. 106,070, dated Jun. 29, 2017.
Declaration of Matt Amdur before Patent Trial and Appeal Board, Patent Interference No. 106,070, dated Jun. 29, 2017.
Declaration of Oded Kedem in Support of Zerto's Opposition to EMC's Renewed Motion for an Ongoing Royalty Rate covering Post Judgement Sales in United States District Court for Delaware Case 1:12-cv-00956-GMS, dated Sep. 1, 2016.
Declaration of Thomas R. Galligan before Patent Trial and Appeal Board, Patent Interference No. 106,070, dated Jul. 6, 2017.
Declaration of Ziv Kedem in Support of Zerto's Opposition to EMC's Renewed Motion for an Ongoing Royalty Rate Covering Post Judgment Sales in the United States District Court for Delaware Case 1:12-cv-00956-GMS, dated Sep. 1, 2016.
Declaration-Bd.R. 203(b) USPTO *Natanzon et al.* (U.S. Appl. No. 13/404,129) v *Kedem* (U.S. Appl. No. 13/039,446), dated Jan. 17, 2017.
Defendant Zerto, Inc.'s Notice of Appeal in the United States District Court for the District of Delaware, Case No. 12-956-GMS, dated Sep. 7, 2017.
Defendant Zerto, Inc.'s. Notice of Appeal in the United States District Court, dated Sep. 7, 2017.
Defendant Zerto's Answering Brief in Opposition to Plaintiffs Motion Concerning an Ongoing Royalty Rate Covering Post Judgment Sales in United States District Court for Delaware Case 1:12-cv-00956-GMS dated Sep. 1, 2016.
Defendant Zerto's Notice of Appeal, Case 1:12-cv-00956-GMS, dated Sep. 7, 2017.
Defendant Zerto's Objections to Plaintiffs Bill of Costs, Case 1:12-cv-00956-GMS, dated Aug. 21, 2017.
E-mail from Allan Lipka dated Apr. 4, 2006, Re: Ezra Tech DD Presentation.
E-mail from Allan Lipka dated Feb. 28, 2006, Re:Topio.
E-mail from Chen Burshan dated Aug. 17, 2006, Re:Version 2.3 core documents.

(56) References Cited

OTHER PUBLICATIONS

E-mail from Christos Karamanlis dated Apr. 3, 2006, Ezra Feedback.
E-mail from Christos Karamanolis dated Mar. 9, 2006, Kashya scalability testing.
E-mail from Christos Karamanolis, dated Jan. 30, 2016. FW:Disaster Recovery.
E-mail from Karthik Rau dated Mar. 15, 2006, Re: Updated Docs.
EMC's Motions to Supplement the Record on its Motion for Permanent Injunction, dated Dec. 4, 2015.
EMC's Opening Brief in Support of its Renewed Motion for an Ongoing Royalty Rate Covering Post Judgment Sales in United States District Court for Delaware case 1:12-cv-00956-GMS, dated Jul. 22, 2016.
EMC's Reply Brief in Support of its Renewed Motion for an Ongoing Royalty Rate Covering Post-Judgment Sales in the United States District Court for Delaware Case 1:12-cv-00956-GMS, dated Oct. 4, 2016.
EMC's Reply Brief, dated Jan. 11, 2017.
EMC's Reply in Support of Its Motion to Supplement the Record on Its Motion for a Permanent Injunction, dated Jan. 4, 2016.
EMC's Response Letter regarding Ongoing Royalty Rates. Case 1:12-cv-00956-GMS, dated Aug. 9, 2017.
Exhibit 2024, VMware—answers PDF attachment to E-mail from A. Lipka.
Exhibit 2025, E-mail from Allan Lipka dated Apr. 6, 2008, Ezra Feedback.
Exhibit 2026, E-mail from Shlomo Ahal dated Jun. 4, 2006, summaries for Shlomo's trip.
Exhibit 2027, VMware summary word attachment to E-mail from S. Ahal dated Jun. 4, 2006, Patent Interference No. 106,070.
Exhibit 2028—VMware summary—Boston meetings attached to Jun. 4, 2016 E-mail from Sh.Ahal.
Exhibit 2029, Possible Configurations of a K-Based ESX DR Solution v.1, dated Apr. 14, 2006.
Exhibit 2030, Word attachment to Jun. 21, 2006 E-mail from J. Blumenthal, Possible Configurations of a Kashya-based ESX DR solution v.2.
Exhibit 2031, Word attachment to Jun. 21, 2006 E-mail from J. Blumenthal, Possible Configurations of a Kashya based ESX Dr Solution, with comments.
Exhibit 2032, E-mail from John Blumenthal dated Jun. 21, 2006, Integration Discussion Notes.
Exhibit 2033, E-mail from Ziv Kedem dated Aug. 15, 2006, VMware Kashya Summary.
Exhibit 2034, Word attachment to Aug. 15, 2006 E-mail from Z Kedem.
Exhibit 2035 E-mail from Narasimha Raghunandana dated Aug. 15, 2006, Kashya binary that can be installed in a virtual machine.
Exhibit 2037, E-mail from Shlomo Ahal dated Sep. 13, 2006, FW:proj plan.
Exhibit 2038, Word attachment to Sep. 13, 2006 E-mail from Shlomo Ahal, Disaster Recovery Project Plan.
Exhibit 2039, Kashya in VM Performance Evaluation, dated Jan. 19, 2017.
Exhibit 2046, Initial Complaint in United States District Court for Delaware, dated Jul. 20, 2012.
Exhibit 2051. Federal Circuit Affirmance Judgement 1-12-cv-00956-GMS, Jun. 12, 2017.
Exhibit A "Trade in Trade Up", dated Dec. 21, 2015.
Exhibit A "United States Patent and Trademark Office; *Hughes Networks Systems LLC* v *California Institute of Technology*", dated Jan. 5, 2016.
Exhibit A Case 1:12-cv-00956-GMS, dated Jul. 22, 2016.
Exhibit A Case 1:12-cv-00956-GMS, dated Sep. 1, 2016.
Exhibit B Case 1:12-cv-00956-GMS, dated Jul. 22, 2016.
Exhibit B Case 1:12-cv-00956-GMS, dated Sep. 1, 2016.
Exhibit M, Case 1:12-cv-00956-GMS dated Oct. 4, 2016.
Exhibit N, Case 1:12-cv-00956-GMS, dated Oct. 4, 2016.
Exhibit 2059, Annotated Zerto Claim 1, Patent Interference No. 106,070.
Exhibit 2060, Annotated EMC Claim 17.
Exhibit 2036, E-mail from Shlomo Ahal dated Aug. 28, 2006, iKVM Workplan.
Exhibit 2040, E-mail from Matt Amdur dated Feb. 20, 2007, KVM iSCI stability.
Exhibit 2041, Santorini Functional Specifications Document, dated Jul. 10, 2007.
Exhibit 2042, E-mail from Tzach Schechner dated Mar. 1, 2007, Kashya org chart.
Exhibit 2043, E-mail from Allan Lipka dated Apr. 4, 2006, Diligence Follow Up Questions.
Exhibit 2044, E-mail from Yair Heller dated Apr. 6, 2006, Diligence follow up questions.
Exhibit 2045, E-mail from Karthik Rau dated Mar. 16, 2006, FW: Kashya scalability testing.
Exhibit 2047, First Amended Complaint in United States District Court for Delaware 1-12-cv-00956-GMS/, dated Aug. 19, 2013.
Exhibit 2048, Zerto's Amended Answer to the First Amended Complaint, Affirmative Defenses, and Counterclaims 1-12-cv-00956-GMS, dated Aug. 7, 2014.
Exhibit 2049, Jury Verdict Form 1-12-cv-00956-GMS in United States District Court for Delaware.
Exhibit 2052, LinkedIn profile of Shlomo Ahal, dated Jun. 13, 2017.
Exhibit 2053, Zerto Hypervisor-Based Replication, dated Jun. 23, 2017.
Exhibit 2056, Zerto's Non-provisional U.S. Appl. No. 13/039,446, filed Mar. 3, 2011.
Exhibit 2061, LinkedIn profile of Tzach Schechner, dated Jun. 26, 2017.
Exhibits A-E, dated Dec. 4, 2015.
Ezra PowerPoint attachment to Apr. 4, 2006 E-mail from Allan Lipka, Kashya Company Overview.
Initial Conference Call Transcript of Mar. 16, 2017 Before Hon Sally Gardner Lane, Patent Interference No. 106,070.
Kashya Architecture PowerPoint attachment to Apr. 4, 2006 E-mail from A. Lipka.
Kashya KBX5000 Product Release 2.0 Administrators Guide, dated Nov. 15, 2004.
Kashya KBX5000 Product Release 2.3 Administrators Guide, dated Jul. 11, 2006.
Kashya KBX5000 Version 2.3 Release Notes, dated May 15, 2006.
Kedem Annotated Claims, Patent Interference No. 106,070, dated Feb. 14, 2017.
Kedem Clean Claims, Patent Interference No. 106,070, dated Jan. 31, 2017.
Kedem Exhibit 1001, LinkedIn page of Matan Gilat, dated Sep. 13, 2017.
Kedem Exhibit 1002, U.S. Patents Listing "Karamonlis, C" as an Inventor.
Kedem Exhibit 1003, U.S. Patent Application No. 2009/0254582 Al, published Oct. 8, 2009.
Kedem Exhibit 1004, Declaration of Ziv Kedem, dated Oct. 20, 2017.
Kedem Exhibit 1005, Declaration of Oded Kedem, dated Oct. 20, 2017.
Kedem Exhibit 1006, Declaration of Matthew D. Green, dated Oct. 20, 2017.
Kedem Exhibit 1007, Priority Statement for Provisional Patent Application, dated Mar. 16, 2010.
Kedem Exhibit 1008, Executed Acknowledgement of No Contribution, Nov. 7, 2009.
Kedem Exhibit 1009, Declaration and Power of Attorney for U.S. Appl. No. 13/404,129, filed Feb. 14, 2012.
Kedem Exhibit 1010, Zerto, Inc. Executive Summary.
Kedem Exhibit 1011, Zerto, Inc. Investor Deck, dated Mar. 2010.
Kedem Exhibit 1012, Investor Voice Over.
Kedem Exhibit 1013, Zerto Overview, dated Mar. 2010.
Kedem Exhibit 1014, Zerto—Addressing the needs of Virtual Mission Critical Applications and Cloud, web.archive.org., dated Oct. 16, 2017.

(56) References Cited

OTHER PUBLICATIONS

Kedem Exhibit 1015, Dictionary of Computer and Internet Terms., Ninth Edition, Douglas A. Downing, et al. pp. 138, 156 (2006).
Kedem Exhibit 1016, Small Computer System Interface-2, American National Standard for Information Systems, dated Jan. 31, 1994.
Kedem Exhibit 1017, Standard Affidavit, www.archive.org.
Kedem Exhibit 1018, Frequently Asked Questions, www.archive.org.
Kedem Exhibit 1019, "Kedem Brothers Launch Zerto, Bringing Disaster Recovery to the Cloud," www.web.archive.org.
Kedem Exhibit 1020, "Enterprise-Class Disaster Recovery for VMware", www.web.archive.org.
Kedem Exhibit 1021, "Hypervisor-Based, Enterprise-Class Replication and Continuous Data Protection," www.web.archive.org.
Kedem Exhibit 1022, "Hypervisor-Based Replication", www.web.archive.org.
Kedem Exhibit 1023, "Zerto Wins Best of Show and Gold Awards at VMworld 2011", www.web.archive.org.
Kedem Exhibit 1024, DVD of EMC Innovator Assaf Natanzon.
Kedem Exhibit 1025, Taylor, Colleen, "Red-hot DotCloud is Structure 2011 Launchpad Winner", Gigaom.com, dated Jun. 23, 2011.
Kedem Exhibit 1026, Application Data Sheet and Information Disclosure Statement filed for U.S. Appl. No. 13/039,445, dated Mar. 3, 2011.
Kedem Exhibit 1027, CV of Dr. Matthew Green.
Kedem Exhibit 1028, Yager, Tom, "Virtualization and I/O", Ahead of the Curve, InfoWorld, 25, 15: ProQuest, p. 26, dated Apr. 10, 2006.
Kedem Exhibit 1029, E-mail from Ziv Kedem, Subject: Congratulations on our first Alpha, dated Nov. 3, 2010.
Kedem Exhibit 1030, E-mail from Ziv Kedem, Subject: Installation Calendar, dated Oct. 14, 2010/.
Kedem Exhibit 1031, E-mail from Oded Kedem, Subject: Rescheduling the Zerto install, dated Nov. 1, 2010.
Kedem Exhibit 1032, Device Driver, foldoc.org.
Kedem Exhibit 1033, Micah Sherr, et al., "Signaling vulnerabilities in wiretapping systems", University of Pennsylvania, dated Nov. 8, 2005.
Kedem Exhibit 1034, VMware ESX Server, *Natanzon* v. *Kedem*, Interference No. 106,070.
Kedem Exhibit List, Patent Interference No. 106,070, dated Oct. 20, 2017.
Kedem List of Proposed Motions, Patent Interference No. 106,070, dated Mar. 8, 2017.
Kedem Notice of Related Proceedings, Patent Interference No. 106,070, dated Jan. 31, 2017.
Kedem Objections to the Admissibility of Natanzon's Evidence—for exhibits and materials submitted with Natanzon Motions 1 and 2, Patent Interference No. 106,070, dated Jul. 14, 2017.
Kedem Opposition 1, *Kedem V. Assaf Natanzon* before the Patent Trial and Appeal Board, dated Oct. 20, 2017.
Kedem Opposition 2, *Kedem V. Assaf Natanzon* before the Patent Trial and Appeal Board, dated Oct. 20, 2017.
Letter to Court from EMC regarding Aug. 16 letter to stay Case1:12-cv-00956-GMS, dated Aug. 18, 2016.
Letter to Court from Zerto regarding staying brief regarding Royalty Rate Case1:12-cv-00956-GMS, dated Aug. 16, 2015.
Letter to Judge from EMC regarding Court of Appeals Federal Circuit Order, Case 1:12-cv-00956-GMS, dated Jun. 19, 2017.
Letter to Judge Sleet from Adam Poff Regarding Defendants Response to Plaintiffs Letter of Jun. 19, 2017, Case 1:12-cv-00956-GMS, dated Aug. 21, 2017.
Memorandum regarding Royalties, Case 1:12-cv-00956-GMS, dated Aug. 10, 2017.
Memorandum United States District Court Delaware, dated Mar. 31, 2016.
Natanzon Annotated Claims, Patent Interference No. 106,070, dated Feb. 14, 2017.
Natanzon Clean Claims, Patent Interference No. 106,070, dated Feb. 1, 2017.
Natanzon Exhibit 2008, Zerto U.S. Appl. No. 13/039,446 published as US 2011/0231841, dated Nov. 22, 2011.
Natanzon Exhibit 2050, *EMC* v. *Zerto*, Judgment, dated May 21, 2015.
Natanzon Exhibit 2054, U.S. Appl. No. 61/314,589, filed Mar. 17, 2010.
Natanzon Exhibit 2055, USPTO Notice of Recordation of Assignment tab of Zerto U.S. Appl. No. 61/314,589, dated Jun. 10, 2017.
Natanzon Exhibit 2058, EMC U.S. Appl. No. 13/404,129 as Published US 20130014104 A1, dated Jan. 10, 2013.
Natanzon Exhibit 2062, Petition Under 37 C.F.R. and 1.47 A for U.S. Appl. No. 13/404,129, dated Aug. 14, 2012.
Natanzon Exhibit 2063, Employment Agreement of Oded Kedem, dated May 9, 2006.
Natanzon Exhibit 2064, Inventions Assignment, Nondisclosure and Noncompetition Agreement between Kashya Ltd. and Shlomo Ahal, dated May 8, 2006.
Natanzon Exhibit 2065, EMC International Key Employee Agreement of Tzach Shechner, dated May 22, 2006.
Natanzon Exhibit 2066, CV of Ian Jestice.
Natanzon Exhibit 2067, Statement of Facts Submitted with Petition for Application on Behalf of Nonsigning Inventors, dated Aug. 10, 2012.
Natanzon Exhibit 2068, Exhibit A Declaration, Power of Attorney and Assignment signed by Assaf Natanzon on Oct. 6, 2012, and Christos Karamanolis on Jul. 10, 2012.
Natanzon Exhibit 2069, Renewed Petition, dated Sep. 5, 2012.
Natanzon Exhibit 2070, USPTO Decision on Renewed Petition, dated Sep. 21, 2012.
Natanzon Exhibit 2071, Response to Non-Final Office Action for U.S. Appl. No. 13/404,129, dated Nov. 18, 2015.
Natanzon Exhibit 2072, Supplemental Application Data Sheet, dated Jul. 11, 2017.
Natanzon Exhibit List, Patent Interference No. 106,070, dated Jul. 7, 2017.
Natanzon List of Proposed Motions, Patent Interference No. 106,070, dated Mar. 8, 2017.
Natanzon Motion 1, Patent Interference No. 106,070, dated Jul. 7, 2017.
Natanzon Motion 2 (to correct inventorship), Patent Interference No. 106,070, dated Jul. 7, 2017.
Natanzon Notice of Related Proceedings, Patent Interference No. 106,070, dated Feb. 1, 2017.
Natanzon Priority Statement, Patent Interference No. 106, 070, dated Jul. 7, 2017.
Natanzon Request for File Copies, Patent Interference No. 106,070, dated Feb. 1, 2017.
Natanzon Updated Exhibit List, Patent Interference No. 106,070, dated Jul. 11, 2017.
Natanzon, Exhibit 2073, Authorization to Charge Fees for Correction of Inventorship, dated Jul. 11, 2017.
Natazon Notice of Notice of Filing Deposition Transcripts, Patent Interference No. 106,070, dated Oct. 19, 2017.
Non-Confidential Joint Appendix in the U.S. Court of Appeals for Federal Circuit, Case 16-1856, Document 52-1, Appx2344-4106, pp. 176-350, filed Jan. 18, 2017.
Non-Confidential Joint Appendix in the U.S. Court of Appeals for the Federal Circuit, Case No. 2016-1856, -1883, vol. I of III, Document 51-1, Appx1-1597, pp. 1-160, filed Jan. 18, 2017.
Non-Confidential Joint Appendix in the U.S. Court of Appeals for the Federal Circuit, Case No. 2016-1856, -1883, vol. II of III, Document 56-2, Appx1616-4883, pp. 1-225, filed Jan. 18, 2017.
Non-Confidential Joint Appendix in the U.S. Court of Appeals for the Federal Circuit, Case No. 2016-1856, -1883, vol. III of III, Document 56-3, Appx4884-5884, pp. 1-148, filed Jan. 18, 2017.
Non-Confidential Joint Appendix U.S. Pat. No. 5,991,813 in the United States Court of Appeals for the Federal Circuit, Case No. 2016-1856, -1883, Document 52-2, pp. 1-101, filed Jan. 18, 2017.
Non-Confidential Joint Appendix in the United States Court of Appeals for the Federal Circuit, Case No. 2016-1856, -1883, Document 56-2, pp. 226-251, Jan. 18, 2017.

(56) References Cited

OTHER PUBLICATIONS

Non-Confidential Joint Appendix U.S. Pat. No. 7,603,395 B1 in the United States Court of Appeals for the Federal Circuit Case No. 2016-1856, -1883, Appx5358, filed Jan. 18, 2017.
Non-Confidential Joint Appendix U.S. Pat. No. 7,603,395 B1 in the United States Court of Appeals for the Federal Circuit Case No. 2016-1856, -1883, Document 51-2, Appx147, pp. 1-456, filed Jan. 18, 2017.
Notice of Allowance on U.S. Appl. No. 13/175,898 dated Mar. 29, 2017 (9 pages).
Office Action on U.S. Appl. No. 13/175,898 dated Nov. 4, 2016 (11 pages).
Office Action on U.S. Appl. No. 15/240,847 dated May 15, 2017 (12 pages).
Opposition of Cross-Appellants EMC Corporation and EMC Israel Development Center Ltd. to Appellant Zerto, Inc.'s Motion for Extension of Time to File Its Response/Reply Brief, Appeals from the United States District Court for the District of Delaware in No. 1:12-cv-00956-GMS, Judge Gregory M. Sleet, dated Sep. 30, 2016.
Order Authorizing Copies of Office Records, Patent Interference No. 106,070, filed Feb. 2, 2016.
Order Granting Extension of Time to file Opening Brief, dated May 11, 2016.
Order Miscellaneous Bd. R. 104a, *Natanzon V. Kedem*, dated Jul. 11, 2017.
Order Motion Times Mar. 16 Call, Patent Interference No. 106,070, entered Mar. 20, 2017.
Order on Motion, United States Court of Appeals for the Federal Circuit, Case No. 2016-1856,-1883, dated Oct. 5, 2016.
Order regarding Post-Trial Motion, dated, Mar. 31, 2016.
Plaintiff EMC and EMC Israel Development Center Ltd., Bill of Costs in the United States District Court for Delaware, Case 1:12-cv-00956-GMS, dated Aug. 8, 2017.
PowerPoint attachment to Jan. 30, 2006 email from Christos Karamanlis. Project: Ezra Technical Due Diligence Meeting Notes, dated Mar. 28-31, 2006.
Standing Order Before the Board of Patent Appeals and Interferences, entered Mar. 8, 2011.
Supplement to Natanzon Motion 2, dated Jul. 11, 2017.
U.S. Notice of Allowance on U.S. Appl. No. 13/175,892 dated Oct. 17, 2017 (5 pages).
U.S. Notice of Allowance on U.S. Appl. No. 13/175,892 dated Oct. 3, 2017 (8 pages).
U.S. Office Action on U.S. Appl. No. 14/831,623 dated Jul. 31, 2017 (7 pages).
U.S. Office Action on U.S. Appl. No. 15/231,388 dated Aug. 29, 2017 (10 pages).
U.S. Office Action on U.S. Appl. No. 15/240,847 dated Oct. 23, 2017 (23 pages).
Word attachment to Mar. 15, 2006 email from K. Rau, ESX Disaster Recovery Roadmap.
Zerto Continuation U.S. Patent Application as published US20160357593 A1, dated Oct. 8, 2016.
Zerto, Inc.'s Appeal Brief in the United States District Court for the District of Delaware in No. 1:12-cv-00956-GMS, Judge Gregory M. Sleet, dated Aug. 5, 2016.
Zerto's Appeal Brief, dated Aug. 5, 2016.
Zerto's Corrected Response and Reply Brief, dated Dec. 21, 2016.
Zerto's Motion for Extension of Time to file its Initial Brief, dated May 4, 2016.
Zerto's Opposition to the EMC Motion to Supplement the Record, dated Dec. 21, 2015.
Notice of Allowance on U.S. Appl. No. 13/175,892 dated Mar. 2, 2018.
Office Action on U.S. Appl. No. 14/831,623 dated Feb. 22, 2018.
Office Action on U.S. Appl. No. 15/231,388 dated Feb. 23, 2018.
Office Action on U.S. Appl. No. 15/289,568 dated Mar. 29, 2018.
Non-Final Office Action on U.S. Appl. No 14/831,623 dated Sep. 13, 2018.
Affidavit of Christopher Butler and Exhibit A regarding Ex. 1, dated Nov. 8, 2017.
Affidavit of Christopher Butler and Exhibit A regarding Exs., dated Nov. 8, 2017.
Clerk's Notice of Deficient Document, dated Nov. 30, 2017.
Declaration of Lisa Kieper, dated Nov. 13, 2017.
Kedem Exhibit 1035, Transcript of Video Deposition of Ziv Kedem, dated Dec. 7, 2017.
Kedem Exhibit 1036, Transcript of Video Deposition of Matthew Green, dated Dec. 13, 2017.
Kedem Exhibit 1037, Transcript of Video Deposition of Oded Kedem, dated Dec. 19, 2017.
Kedem Exhibit 1038, Kedem Objections to the Admissibility of Natanzon's Evidence (for exhibits and materials submitted with Natanzon Motions 1 and 2), dated Jul. 14, 2017.
Kedem Exhibit 1039, Kedem Objections to the Admissibility of Natanzon's Evidence (for exhibits and materials submitted with Natanzon Replies 1 and 2), dated Jan. 12, 2018.
Kedem Miscellaneous Motion 1 (to exclude Natanzon's Evidence, dated Jan. 17, 2018.
Kedem Notice of Filing and Service of Deposition Transcripts, Patent Interference No. 106,070, dated Jan. 5, 2018.
Kedem Notice of Service of Supplemental Evidence, dated Nov. 13, 2017.
Kedem Objections to the Admissibility of Natanzon's Evidence (for exhibits and materials submitted with Natanzon Replies 1 and 2), dated Jan. 12, 2018.
Kedem Opposition to Natanzon Motion to Exclude Evidence, dated Feb. 1, 2018.
Kedem Reply 1 (to Exclude Natanzon Evidence), dated Feb. 7, 2018.
Kedem Request for Oral Argument, dated Jan. 17, 2018.
Kedem Updated Exhibit List, dated Jan. 17, 2018.
Kedem Updated Exhibit List, Patent Interference No. 106,070, dated Jan. 5, 2018.
Natanzon Exhibit 2082, Kedem Opposition 1 to Natanzon Motion for Judgment under 35 U.S.C. sec. 102(f), dated Oct. 20, 2017.
Natanzon Exhibit 2083, Diagram of Tapping Driver.
Natanzon Exhibit 2084, Diagram of Driver.
Natanzon Exhibit 2085, Zerto, Manchester VMUG 2014 and Technical Overview.
Natanzon Exhibit 2086, LinkedIn Profile of Darren Swift, Rubrik, Inc., dated Dec. 5, 2017.
Natanzon Exhibit 2087, Cisco MDS 9000 Family SANTap with EMC RecoverPoint Design Guide, dated Apr. 2009.
Natanzon Exhibit 2088, Disk Backup, A look inside continuous data protection software, dated Dec. 6, 2017.
Natanzon Exhibit 2089, Handwritten List of Questions.
Natanzon Exhibit 2090, American Heritage Dictionary, Second College Edition, p. 669.
Natanzon Exhibit 2091, Webster's Ninth New Collegiate Dictionary, Miriam-Webster, p. 630 (1990).
Natanzon Exhibit 2092, Collins English Dictionary, Updated Edition, p. 804.
Natanzon Exhibit 2093, American Heritage Student Dictionary, Updated Edition, p. 941.
Natanzon Exhibit 2094, Denning, Dorothy E., Cryptography and Data Security, Addison-Wesley Publishing Company, Inc., 1982.
Natanzon Exhibit 2095, U.S. Patent Application No. 2007/0220311 A1, published Sep. 20, 2007.
Natanzon Exhibit 2096, Webster's Ninth New Collegiate Dictionary, Miriam-Webster, p. 1206 (1990).
Natanzon Exhibit 2097, Assignment for U.S. Patent Application No. 2011/356,920, Reel 017879 Frame 0115-0117, dated May 12, 2006.
Natanzon Exhibit 2098, U.S. Office Action for Appl. U.S. Appl. No. 13/039,446 dated Jan. 2, 2015.
Natanzon Exhibit 2099, Natanzon Objections to the Admissibility of Kedem's Evidence (for exhibits and materials submitted with Kedem Oppositions 1 and 2), dated Oct. 27, 2017.
Natanzon Motion to Exclude, dated Jan. 17, 2018.
Natanzon Notice of Deposition of Oded Kedem, dated Dec. 1, 2017.
Natanzon Notice of Deposition of Professor Matthew Green, dated Dec. 1, 2017.

(56) References Cited

OTHER PUBLICATIONS

Natanzon Notice of Deposition of Ziv Kedem, dated Dec. 1, 2017.
Natanzon Notice of Filing Deposition Transcripts, Patent Interference No. 106,070, dated Oct. 19, 2017.
Natanzon Objections to the Admissibility of Kedem's Evidence, for exhibits and materials submitted with Kedem Oppositions 1 and 2, dated Oct. 27, 2017.
Natanzon Opposition to Kedem Miscellaneous Motion 1 (to exclude Natanzon's Evidence), dated Feb. 1, 2018.
Natanzon Reply 1, dated Jan. 9, 2018.
Natanzon Reply 2, dated Jan. 9, 2018.
Natanzon Request for Oral Argument, dated Jan. 17, 2018.
Natanzon Updated Exhibit List, Patent Interference No. 106,070, dated Oct. 19, 2017.
Notice of Stipulation to Extend Time Periods 4-6, dated Nov. 30, 2017.
Reply in Support of Natanzon Motion to Exclude, dated Feb. 7, 2018.
Amended Order Governing Mediation Conferences and Meditation Statements for The United States District Court for the District of Delaware Case 1:12-cv-00956-GMS dated Jun. 1, 2016.
Decision—Motion—Bd. R. 5(a): 121(a)(3), Patent Interference No. 106,070, Sep. 18, 2017.
Declaration of Lucas Silva in Support of Zerto's Opposition to EMC's Renewed Motion for an Ongoing Royalty Rate Covering Post Judgment Sales in the United States District Court for Delaware Case 1:12-cv-00956-Gms, Sep. 1, 2016.
Declaration of Nathan Speed in Support of EMC's Reply Brief in Support of its Motion for a Renewed Ongoing Royalty in the United States District Court for Delaware Case 1:12-vc-00956-GMS dated Oct. 4, 2016.
Declaration of Nathan Speed in Support of Plaintiffs Bill of Costs, Case 1:12-cv-00956-GMS, Aug. 8, 2017.
E-mail from Christos Karamanolis, dated Apr. 3, 2006, RE: Ezra feedback.
EMC Corporation and EMC Israel Development Center Ltd.'s Docketing Statement in the United States Court of Appeals for the Federal Circuit, Case No. 16-1856, 16-1883, Apr. 29, 2016.
EMC Corporation's Corrected Docketing Statement in the United States Court of Appeals for The Federal Circuit, Case No. 17-2519, Sep. 22, 2017.
EMC's corrected docketing statement dated Sep. 22, 2017.
EMC's Docketing Statement dated Apr. 29, 2016.
EMC's Notice of Intent to Redact dated Apr. 5, 2016.
EMC's Renewed Motion for an Ongoing Royalty Rate Covering Post-Judgement Sales in the United States District Court for the District of Delaware Case 1:12-cv-00956-GMS dated Jul. 14, 2016.
Exhibit O, case 1:12-cv-00956-GMS, Oct. 4, 2016.
Exhibit P, Case 1:12-cv-00956-Gms, Oct. 4,2016.
Filing Receipt for No. 24, Natanzon V. Kedem.
Interference Efiling Receipt, No. 106070, Jan. 31, 2017.
Judgment - Bd. R. 127 (a), issued in Patent Interference No. 106,070, Dec. 20, 2018.
Judgment from the United States Court of Appeals for The Federal Circuit dated Jun. 12, 2017.
Kedem Notice of Change of Lead and Backup Counsel, Patent Interference No. 106,070 (Sep. 12, 2017).
Kedem Notice of Deposition for Alan Lipka for Sep. 29, 2017, Patent Interference No. 106,070 (Sep. 11, 2017).
Kedem Notice of Deposition for Chris Karamanolis for Sep. 25 and 26, 2017, Patent Interference No. 106,070 (Sep. 11, 2017).
Kedem Notice of Deposition for Ian Jestice for Sep. 28, 2017, Patent Interference No. 106,070 (Sep. 11, 2017).
Kedem Notice of Deposition for Matt Amdur for Sep. 26, 2017, Patent Interference No. 106,070 (Sep. 11, 2017).
Kedem Notice of Deposition of Matan Gilat for Sep. 14, 2017, Patent Interference No. 106,070 (Sep. 11, 2017).
Kedem Notice of Lead and Backup Counsel, Patent Interference No. 106,070, Jan. 31,2017.
Kedem Notice of Real Party in Interest, Patent Interference No. 106,070, Jan. 31,2017.
Natanzon Notice of Service of Priority Statement, Patent Interference No. 106,070, Jul. 10, 2017.
Kedem Notice of Settlement Discussions, Patent Interference No. 106,070, May 4,2017.
Kedem Priority Statement, Patent Interference No. 106,070, Filed Jul. 7, 2017.
Keaem Request tor File Copies, Patent interterence No. 106,070 Jan. 31, 2017.
Letter from EMC to court enclosing appendix pages dated May 8, 2017.
Letter from Zerto to Court enclosing appendix pages date May 9, 2017.
Mandate from Court of Appeals for Federal Circuit, Case 1:12-cv-00956-Gms,Jul. 19, 2017.
Mandate from United State Court of Appeals for the Federal Circuit dated Jul. 19, 2017.
Natanzon Exhibit 2005, Declaration of Matt Amdur, Patent Interference No. 106,070, Jun. 29, 2017.
Natanzon Exhibit 2006, Declaration of Matan Gilat, Patent Interference No. 106,070, Jun. 29, 2017.
Natanzon Exhibit 2075, Declaration of Nathan R. Speed in Support of Motion for Admission Pro Hac Vice, Patent Interference No. 106,070, Sep. 11, 2017.
Natanzon Exhibit 2076, Transcript of Deposition of Matan Gilat, Sep. 14, 2017.
Natanzon Exhibit 2077, Transcript of Deposition of Allan Lipka, Sep. 28, 2017.
Natanzon Exhibit 2078, Transcript of Deposition of Allan Lipka, Sep. 29, 2017.
Natanzon Exhibit 2079, Transcript of Deposition of Christos Karamanolis, Sep. 25, 2017.
Natanzon Exhibit 2080, Transcript of Deposition of Christos Karamanolis, Sep. 26, 2017.
Natanzon Exhibit 2081, Transcript of Deposition of Matthew Amdur, Sep. 26, 2017.
Natanzon Notice of Change in Lead and Backup Counsel, Patent Interference No. 106,070, Jun. 6, 2017.
Natanzon Notice of Lead and Backup Counsel, Patent Interference No. 106,070, Feb. 1, 2017.
Natanzon Notice of Real Party in Interest, Patent Interference No. 106,070, Feb. 1, 2017.
Natanzon Notice of service of Supplemental Evidence, Patent interrerence No. 106,070, dated Jul. 28, 2017.
Natanzon Notice of Serving Priority Statement, Patent Interference No. 106,070, Jul. 10, 2017.
Natanzon Unopposed Miscellaneous Motion 1 (Request for pro hac vice admission of Nathan R. Speed), Patent Interference No. 106,070 (Sep. 12, 2017).
Natanzon Updated Exhibit List, Patent Interference No. 106,070, Jul. 28, 2017.
Natanzon Updated Exhibit List, Patent Interference No. 106,070, Sep. 12, 2017.
Notice of Allowance on U.S. Appl. No. 13/175,892 dated Jun. 14, 2018.
Notice of Allowance on U.S. Appl. No. 13/175,892 dated Oct. 31, 2018.
Notice of Allowance on U.S. Appl. No. 14/687,341 dated Aug. 18, 2016.
Notice of Allowance on U.S. Appl. No. 14/687,341 dated Sep. 19, 2016.
Notice of Allowance on U.S. Appl. No. 15/231,388 dated Aug. 16, 2018.
Notice of Allowance on U.S. Appl. No. 15/231,388 dated Oct. 12, 2018.
Notice of Allowance on U.S. Appl. No. 15/240,847 dated Nov. 15, 2018.
Notice of Allowance on U.S. Appl. No. 15/289,568 dated Jul. 5, 2018.
Notice of Allowance on U.S. Appl. No. 15/289,568 dated Oct. 23, 2018.
Notice of Appeal by Zerto dated Apr. 14, 2016.

(56) References Cited

OTHER PUBLICATIONS

Notice of Docket, United States Court of Appeals for the Federal Circuit, Case 1:12-cv-00956-GMs, Sep. 8, 2017.
Notice of Docketing dated Apr. 15, 2016.
Notice of Docketing dated Apr. 19, 2016.
Notice of Docketing for the United State Court of Appeals for the Federal Circuit, 17-2519—*EMC Corporation V. Zerto Inc*, Sep. 8, 2017.
Notice of Docketing from the United States District Court for the District of Delaware, *EMC Corporation V. Zerto Inc.*, Case No. 1:12-cv-00956-GMS.
Notice of Docketing on Septmember 8, 2017 in the United States Court of Appeals for the Federal Circuit.
Notice of Entry of Judgment Without Opinion Entered Jun. 12, 2016, Case 1:12-cv-00956-GMS, Jun. 13, 2016.
Notice of Entry of Judgment without Opinion in the United States Court of Appeals for the Federal Court, Case No. 16/1856, Jun. 12, 2017.
Notice of Judgment without Opinion dated Jun. 12, 2017.
Notice of Subsequent Authority dated Jan. 5, 2016.
Notice of Withdrawal of Certain Pro Hac Vice Counsel Aaron Moore dated Apr. 11, 2016.
Notice of Withdrawal of Monte Squire dated Nov. 11, 2015.
Order Appellant Zerto's Response and Reply Brief dated Dec. 7, 2016.
Order Governing Mediation Conferences and Mediation Statements dated Apr. 19, 2016.
Order Regarding Royalties in the District Court for Delaware, Case 1:12-cv-009560-Gms, Aug. 10, 2017.
Order rejecting EMC Corporation's Opening Brief in the United States Court of Appeals for the Federal Circuit, Case No. 16-1856, Sep. 15, 2016.
Order Rejecting EMC's Opening Brief dated Sep. 15, 2016.
Order-Miscellaneous- Bs.R 104(a), Patent Interference No. 106,070, Filed Jun. 15, 2017.
Plaintiffs Notice of Cross Appeal dated Apr. 18, 2016.
Zerto Inc Docketing statement dated Apr. 29, 2016.
Zerto, Inc.'s Docketing Statement in the United States Court of Appeals for the Federal Circuit, Case No. 16-1856, 16-1883, Apr. 29, 2016.
Zerto's Docketing Statement dated Sep. 22, 2017.
Zerto's Docketing Statement in the United States Court of Appeals for the Federal Circuit, Case No. 17-2519, Sep. 22, 2017.
Zerto's Notice of Intent to Redact dated Apr. 5, 2016.
Zertos's Citation of Supplemental Authority and Matthew Lowrie's certificate of service dated May 3, 2017.
Email from USPTO re Mar. 31, 2017 Filing Submission Information for 106070.
Email from U.S. Court of Appeals for the Federal Circuit re Nov. 30, 2017 Clerk's Notice of Deficient Document.
Final Office Action on U.S. 14/831,623, dated May 6, 2019, 14 pages.
Natanzon Decision on Rehearing—Bd. R. 125(c), Patent Interference No. 106,070, Apr. 30, 2019.
Natanzon Kedem Opposition 5 (to Natanzon Motion 5, Request for Rehearing) Patent Interference No. 106,070, Mar. 8, 2019.
Natanzon Miscellaneous Motion 5 (Request for Hearing of Decision and Judgement) Patent Interference No. 106,070, Jan. 22, 2019.
Natanzon Order—Authorizing Opposition and Reply—Bd. R. 125(c)(4), Patent Interference No. 106,070, Feb. 6, 2019.
Natanzon Reply 5 (to Opposition to Request for Hearing of Decision and Judgement), Patent Interference No. 106,070, Mar. 22, 2019.
Office Action for U.S. Appl. No. 13/367,448 dated Apr. 26, 2013, 19 pages.
Notice of Allowance on U.S. 15/231,388 dated May 20, 2019.
Notice of Allowance on U.S. Appl. No. 15/240,847 dated Jun. 12, 2019.
Notice of Allowance on U.S. Appl. 15/289,568 dated Jun. 3, 2019.
Non-Final Office Action on U.S. Appl. No. 14/831,623 dated Sep. 20, 2019, 13 pages.
Notice of Allowance on U.S. Appl. No. 13/039,446 dated Nov. 21, 2019, 9 pages.
Notice of Allowance on U.S. Appl. No. 15/231,388 dated Sep. 16, 2019, 8 pages.
Notice of Allowance on U.S. Appl. No. 13/039,446 dated Jan. 13, 2020.
Notice of Allowance on U.S. Appl. No. 15/231,388 dated Jan. 23, 2020, 8 pages.

\* cited by examiner

MULTIPLE POINTS IN TIME DISK IMAGES FOR DISASTER RECOVERY

CROSS REFERENCES TO RELATED APPLICATIONS

This application is a divisional of, and claims the benefit and priority under 35 U.S.C. § 121, to U.S. patent application Ser. No. 13/367,456, titled "MULTIPLE POINTS IN TIME DISK IMAGES FOR DISASTER RECOVERY," filed Feb. 7, 2012 by inventors Tomer Ben Or, Gil Barash, and Chen Burshan, which is a continuation-in-part of U.S. application Ser. No. 13/175,898 entitled METHODS AND APPARATUS FOR PROVIDING HYPERVISOR LEVEL DATA SERVICES FOR SERVER VIRTUALIZATION, filed on Jul. 4, 2011 by inventors Ziv Kedem, Gil Levonai, Yair Kuszpet and Chen Burshan, which is a continuation-in-part of U.S. application Ser. No. 13/039,446, entitled METHODS AND APPARATUS FOR PROVIDING HYPERVISOR LEVEL DATA SERVICES FOR SERVER VIRTUALIZATION, filed on Mar. 3, 2011 by inventor Ziv Kedem, which claims priority benefit of U.S. Provisional Application No. 61/314,589, entitled METHODS AND APPARATUS FOR PROVIDING HYPERVISOR LEVEL DATA SERVICES FOR SERVER VIRTUALIZATION, filed on Mar. 17, 2010 by inventor Ziv Kedem, each of which is incorporated herein by reference in its entirety.

FIELD OF THE INVENTION

The present invention relates to data protection and recovery.

BACKGROUND OF THE INVENTION

Data is at the heart of every enterprise, and is a core component of a data center infrastructure. As data applications become more and more critical, there is a growing need for disaster recovery systems to support application deployment, and provide complete business continuity.

Disaster recovery systems are responsible for data protection and application recovery. Some disaster recovery systems provide continuous data protection, and allow recovery to any point-in-time.

Some disaster recovery systems provide built-in test capabilities, which enable an administrator to test recovery to a previous point in time. When a previous point in time is selected for testing by a disaster recovery system, a disk image is presented to the enterprise data applications, as the disk image existed at the previous point in time. All reads from the disk are directed to the disaster recovery system, which determines where the data for the previous point in time is located—on a replica, or on a redo journal. All writes to the disk are recorded in a separate redo log, to be able to erase them after the test is complete.

There are many advantages to testing a previous point-in-time image, including ensuring that a replica is usable, and finding a point-in-time for recovery prior to a disaster. In a case where data became corrupted at an unknown time, it is of advantage to find a previous point in time as close as possible to the time of corruption, at which the disk image was uncorrupted, in order to minimize loss of data after recovery.

Objectives of disaster recovery plans are generally formulated in terms of a recovery time objective (RTO). RTO is the time it takes to get a non-functional system back on-line, and indicates how fast the organization will be up and running after a disaster. Specifically, RTO is the duration of time within which a business process must be restored after a disaster, in order to avoid unacceptable consequences associated with a break in business continuity. Searching for an appropriate point-in-time prior to failover generally requires testing multiple disk images at different points-in-time, which itself requires a long time to complete and significantly increases the RTO.

In addition, testing multiple disk images generally requires a complete copy of the data. As such, if a disk image is 2 TB and three points in time are to be tested, the storage consumption is at least 8 TB, corresponding to three tests and the replica's gold copy. This drawback makes it costly and impractical to test multiple disk copies in parallel.

It would thus be of advantage to expose multiple disk images at different points in time, as offsets from a gold image, to enable testing in parallel and then selecting a disk image for failover without duplication of data, to support the enterprise RTO.

SUMMARY OF THE DESCRIPTION

Aspects of the present invention provide systems and methods to expose multiple disk images at different points in time, thereby enabling testing in parallel and then selecting a disk image for failover.

Aspects of the present invention relate to a dedicated virtual data service appliance (VDSA) within a hypervisor that can provide a variety of data services. Data services provided by the VDSA include inter alia replication, monitoring and quality of service. The VDSA is fully application-aware.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

The hypervisor architecture of the present invention scales to multiple host sites, each of which hosts multiple hypervisors. The scaling flexibly allows for different numbers of hypervisors at different sites, and different numbers of virtual services and virtual disks within different hypervisors. Each hypervisor includes a VDSA, and each site includes a data services manager to coordinate the VSDAs at the site, and across other sites.

Embodiments of the present invention enable flexibly designating one or more virtual servers within one or more hypervisors at a site as being a virtual protection group, and flexibly designating one or more hypervisors, or alternatively one or more virtual servers within one or more hypervisors at another site as being a replication target for the virtual protection group. Write order fidelity is maintained for virtual protection groups. A site may comprise any number of source and target virtual protection groups. A virtual protection group may have more than one replication target. The number of hypervisors and virtual servers within a virtual protection group and its replication target are not required to be the same.

The hypervisor architecture of the present invention may be used to provide cloud-based hypervisor level data services to multiple enterprises on a shared physical infrastructure, while maintaining control and data path separation between enterprises for security.

The present invention provides bi-directional cloud-based data replication services; i.e., from the enterprise to the cloud, and from the cloud to the enterprise. Moreover, replication targets may be assigned to a pool of resources that do not expose the enterprise infrastructure, thus providing an additional layer of security and privacy between enterprises that share a target physical infrastructure.

The cloud-based data replication services of the present invention support enforcement of data export regulations. As such, data transfer between a source and a destination is automatically restricted if data export regulations restrict data transfer between the corresponding jurisdictions of the source and the destination.

There is thus provided in accordance with an embodiment of the present invention an enterprise disaster recovery system, including at least one data disk, a processor for running at least one data application that reads data from the at least one data disk and writes data to the at least one data disk over a period of time, a recovery test engine that (i) generates in parallel a plurality of processing stacks corresponding to a respective plurality of previous points in time within the period of time, each stack operative to process a command to read data at a designated address from a designated one of the at least one data disk and return data at the designated address in an image of the designated data disk at the previous point in time corresponding to the stack, and (ii) that generates in parallel a plurality of logs of commands issued by the at least one data application to write data into designated addresses of designated ones of the plurality of data disks, each log corresponding to a respective previous point in time, wherein the plurality of previous points in time within the period of time are specified arbitrarily by a user of the system.

There is additionally provided in accordance with an embodiment of the present invention a method for testing enterprise disaster recovery, including receiving an arbitrarily designated plurality of points in time for conducting data recovery tests in parallel, generating in parallel a plurality of processing stacks, each stack corresponding to one of the designated points in time, and each stack operative to receive a command issued by at least one data application to read data from a designated address from a designated data disk and to return data at the designated address in an image of the designated data disk at the designated point in time corresponding to the stack, further generating in parallel a plurality of write commands issued by the at least one data application to write data into designated addresses of designated data disks, and logging the write commands in a plurality of logs, each log corresponding to one of the designated points in time.

BRIEF DESCRIPTION OF THE DRAWINGS

The present invention will be more fully understood and appreciated from the following detailed description, taken in conjunction with the drawings in which:

FIG. 5 is a user interface screenshot of bi-directional replication of virtual protection groups, in accordance with an embodiment of the present invention;

FIG. 6 is a user interface screenshot of assignment of a replication target for a virtual protection group, in accordance with an embodiment of the present invention;

FIG. 18 is a user interface screenshot with a summary of the recovery tests, including the times at which the tests were stopped, in accordance with an embodiment of the present invention;

LIST OF APPENDICES

Appendix I is an application programming interface for virtual replication site controller web services, in accordance with an embodiment of the present invention;

Appendix II is an application programming interface for virtual replication host controller web services, in accordance with an embodiment of the present invention;

Appendix III is an application programming interface for virtual replication protection group controller web services, in accordance with an embodiment of the present invention;

Appendix IV is an application programming interface for virtual replication command tracker web services, in accordance with an embodiment of the present invention; and Appendix V is an application programming interface for virtual replication log collector web services, in accordance with an embodiment of the present invention.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
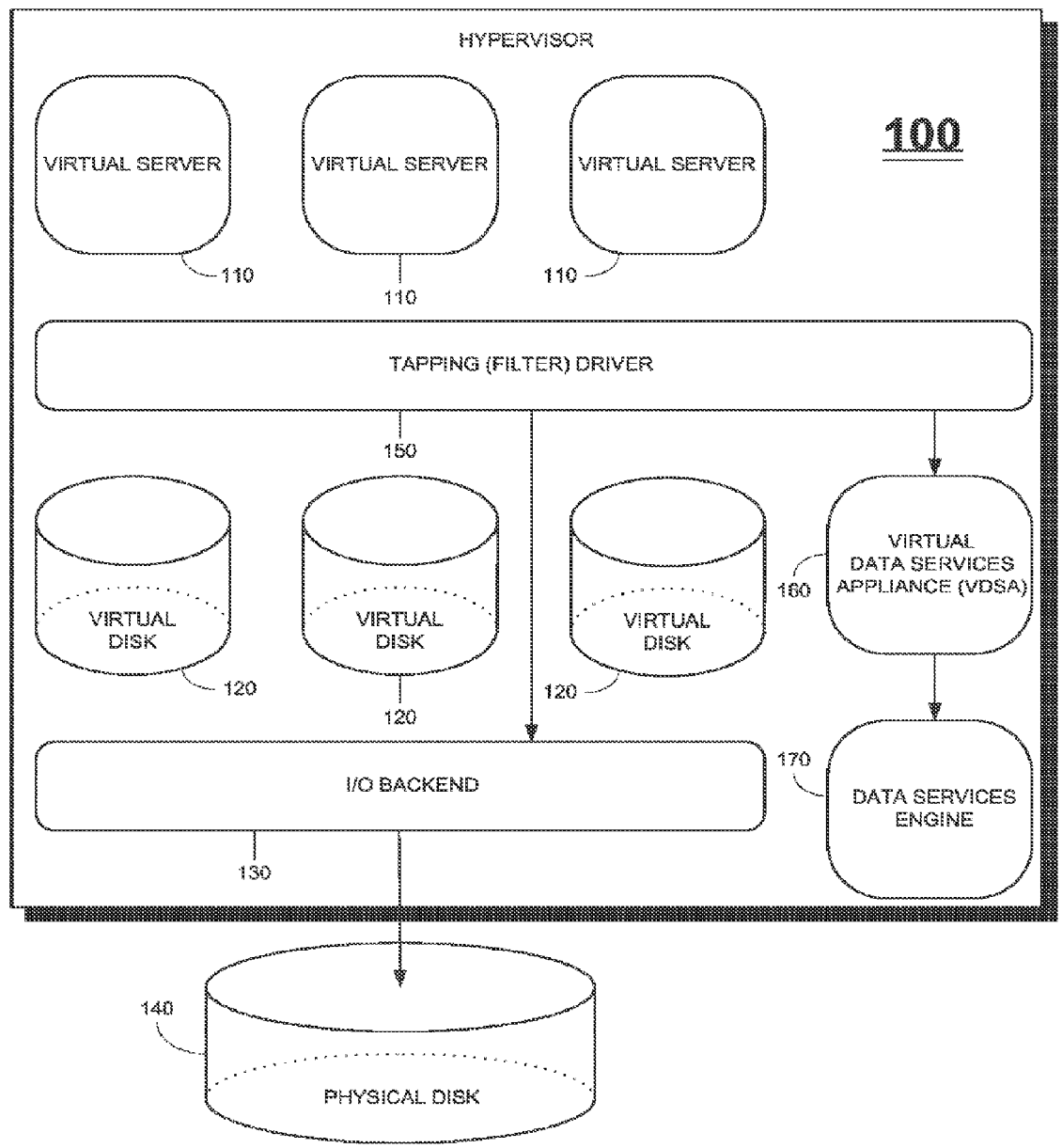
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
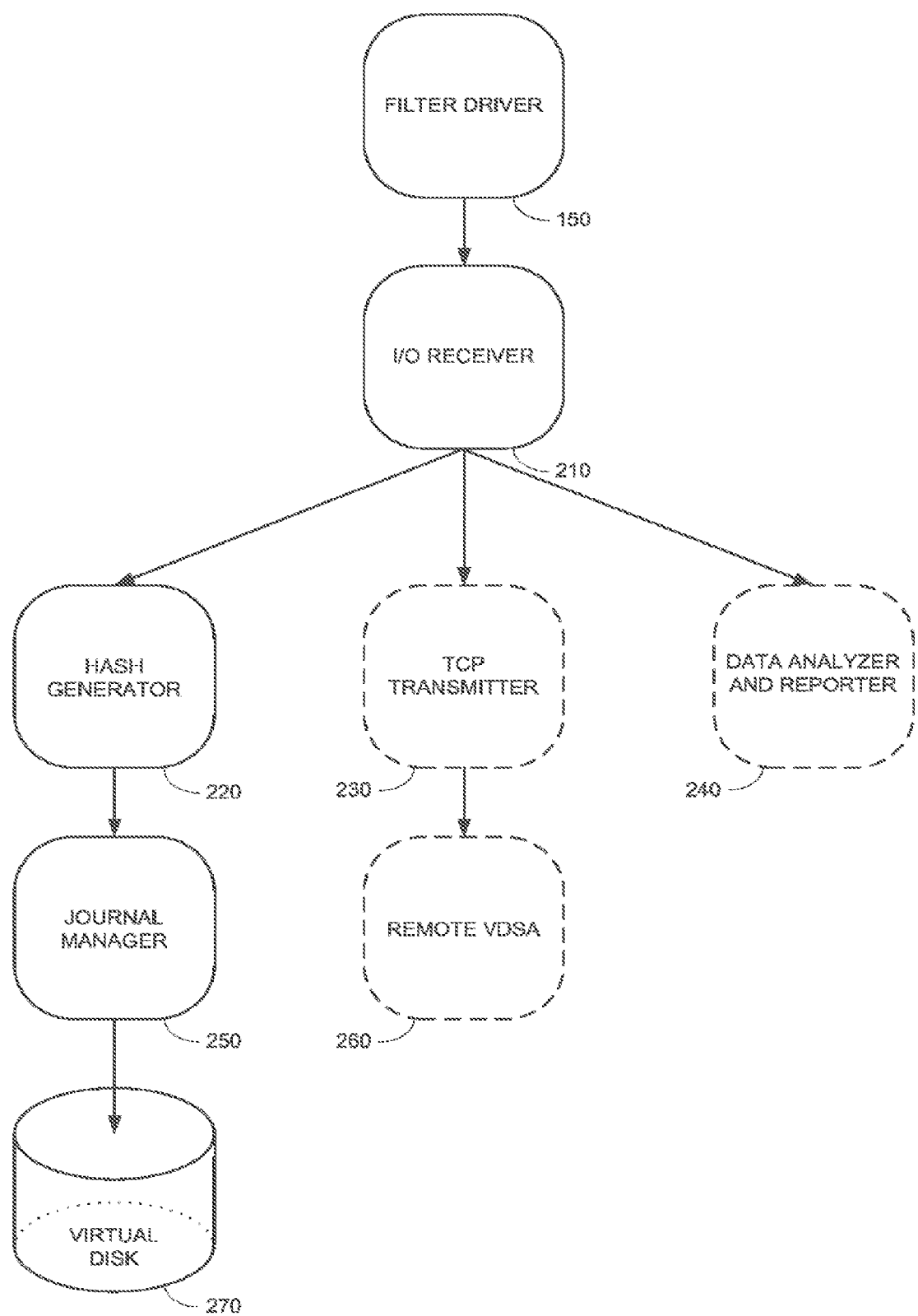
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

Figure 3:
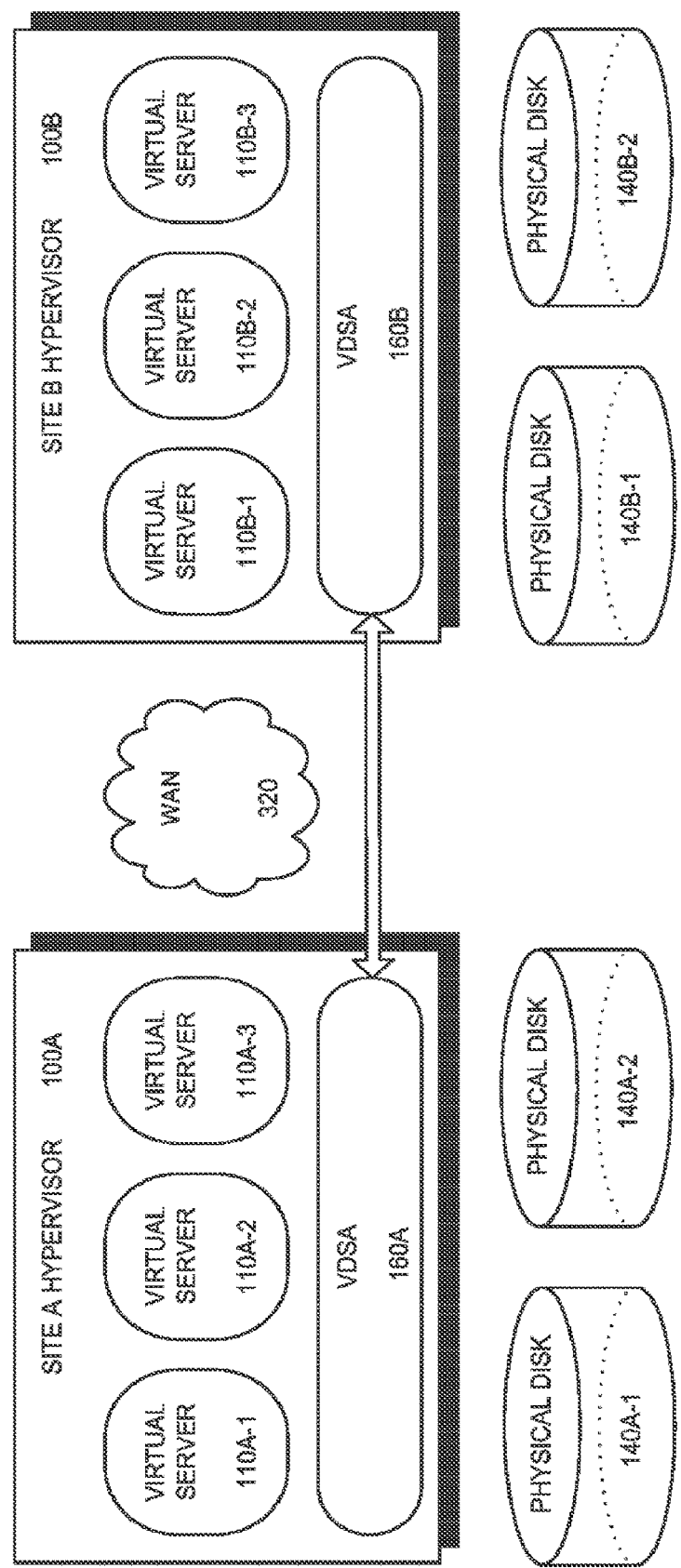
FIG. 3 is a simplified block diagram of a virtual replication system, in accordance with an embodiment of the present invention.

Reference is made to FIG. 3, which is a simplified block diagram of a virtual replication system, in accordance with an embodiment of the present invention. Shown in FIG. 3 is a protected site designated Site A, and a recovery site designated Site B. Site A includes a hypervisor 100A with three virtual servers 110A-1, 110A-2 and 110A-3, and a VDSA 160A. Site A includes two physical disks 140A-1 and 140A-2. Site B includes a hypervisor 100B with a VDSA 160B. Site B includes two physical disks 140B-1 and 140B-2. All or some of virtual servers 110A-1, 110A-2 and 110A-3 may be designated as protected. Once a virtual server is designated as protected, all changes made on the virtual server are replicated at the recovery site.

In accordance with an embodiment of the present invention, every write command from a protected virtual server in hypervisor 100A is intercepted by tapping driver 150 (FIG. 1) and sent asynchronously by VDSA 160A to VDSA 160B for replication, via a wide area network (WAN) 320, while the write command continues to be processed by the protected server.

At Site B, the write command is passed to a journal manager 250 (FIG. 2), for journaling on a Site B virtual disk 270 (FIG. 2). After every few seconds, a checkpoint is written to the Site B journal, and during a recovery one of the checkpoints may be selected for recovering to that point. Additionally, checkpoints may be manually added to the Site B journal by an administrator, along with a description of the checkpoint. E.g., a checkpoint may be added immediately prior to an event taking place that may result in the need to perform a recovery, such as a patch installation, an application upgrade, and a planned switch over to an emergency generator.

In addition to write commands being written to the Site B journal, mirrors 110B-1, 110B-2 and 110B-3 of the respective protected virtual servers 110A-1, 110A-2 and 110A-3 at Site A are created at Site B. The mirrors at Site B are updated at each checkpoint, so that they are mirrors of the corresponding virtual servers at Site A at the point of the last checkpoint. During a failover, an administrator can specify that he wants to recover the virtual servers using the latest data sent from the Site A. Alternatively the administrator can specify an earlier checkpoint, in which case the mirrors on the virtual servers 110B-1, 110-B-2 and 110B-3 are rolled back to the earlier checkpoint, and then the virtual servers are recovered to Site B. As such, the administrator can recover the environment to the point before any corruption, such as a crash or a virus, occurred, and ignore the write commands in the journal that were corrupted.

VDSAs 160A and 160B ensure write order fidelity; i.e., data at Site B is maintained in the same sequence as it was written at Site A. Write commands are kept in sequence by assigning a timestamp or a sequence number to each write at Site A. The write commands are sequenced at Site A, then transmitted to Site B asynchronously, then reordered at Site B to the proper time sequence, and then written to the Site B journal.

The journal file is cyclic; i.e., after a pre-designated time period, the earliest entries in the journal are overwritten by the newest entries.

It will be appreciated by those skilled in the art that the virtual replication appliance of the present invention operates at the hypervisor level, and thus obviates the need to consider physical disks. In distinction, conventional replication systems operate at the physical disk level. Embodiments of the present invention recover write commands at the application level. Conventional replication systems recover write commands at the SCSI level. As such, conventional replication systems are not fully application-aware, whereas embodiment of the present invention are full application-aware, and replicate write commands from an application in a consistent manner.

The present invention offers many advantages.

Hardware Agnostic: Because VDSA 160 manages recovery of virtual servers and virtual disks, it is not tied to specific hardware that is used at the protected site or at the recovery site. The hardware may be from the same vendor, or from different vendors. As long as the storage device supports the i SCSI protocol, any storage device, known today or to be developed in the future, can be used.

Fully Scalable: Because VDSA 160 resides in the hypervisor level, architectures of the present invention scale to multiple sites having multiple hypervisors, as described herein below with reference to FIG. 4.

Efficient Asynchronous Replication: Write commands are captured by VDSA 160 before they are written to a physical disk at the protected site. The write commands are sent to the recovery site asynchronously, and thus avoid long distance replication latency. Moreover, only delta changes are sent to the recovery site, and not a whole file or disk, which reduces the network traffic, thereby reducing WAN requirements and improving recovery time objective and recovery point objective.

Control of Recovery: An administrator controls when a recovery is initiated, and to what point in time it recovers.

Near-Zero Recovery Point Objective (RPO): VDSA 160 continuously protects data, sending a record of every write command transacted at the protected site to the recovery site. As such, recovery may be performed within a requested RPO.

Near-Zero Recovery Time Objective (RTO): During recovery the mirrors of the protected virtual servers are recovered at the recovery site from VDSA 160B, and synchronized to a requested checkpoint. In accordance with an embodiment of the present invention, during synchronization and while the virtual servers at the recovery site are not yet fully synchronized, users can nevertheless access the virtual servers at the recovery site. Each user request to a virtual server is analyzed, and a response is returned either from the virtual server directly, or from the journal if the information in the journal is more up-to-date. Such analysis of user requests continues until the recovery site virtual environment is fully synchronized.

WAN Optimization between Protected and Recovery Sites: In accordance with an embodiment of the present invention, write commands re compressed before being sent from VDSA 160A to VDSA 160B, with throttling used to prioritize network traffic. As such, communication between the protected site and the recovery site is optimized.

WAN Failover Resilience: In accordance with an embodiment of the present invention, data is cached prior to being transmitted to the recovery site. If WAN 320 goes down, the cached data is saved and, as soon as WAN 320 comes up again, the data is sent to the recovery site and both sites are re-synchronized.

Single Point of Control: In accordance with an embodiment of the present invention, both the protected and the recovery site are managed from the same client console.

Secure Multi-Tenant Solution on Shared Hardware: The present invention enables multiple enterprises to use shared hardware at a recovery site for data replication, while maintaining security between the enterprises, as described herein below with reference to FIGS. 9-12.

Figure 4:
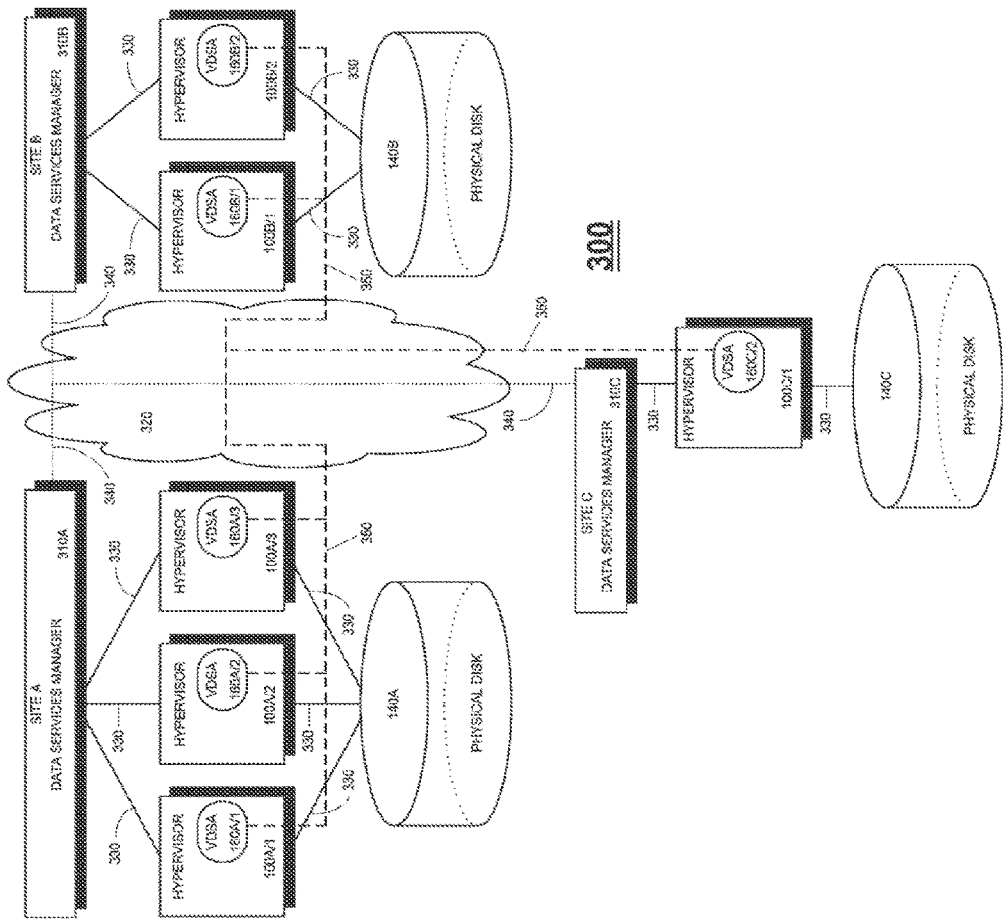
FIG. 4 is a simplified block diagram of a cross-host multiple hypervisor system that includes data services managers for multiple sites that have multiple hypervisors, in accordance with an embodiment of the present invention.

As indicated hereinabove, the architecture of FIG. 1 scales to multiple sites having multiple hypervisors. Reference is made to FIG. 4, which is a simplified block diagram of a cross-host multiple hypervisor system 300 that includes data services managers for multiple sites that have multiple hypervisors, in accordance with an embodiment of the present invention. The architecture of FIG. 4 includes three sites, designated Site A, Site B and Site C, the three sites being communicatively coupled via a network 320. Each site includes one or more hypervisors 100. Specifically, Site A includes three hypervisors, 100A/1, 100A/2 and 100A/3, Site B includes two hypervisors, 100B/1 and 100B/2, and Site C includes one hypervisor 100C/1. The sites have respective one or more physical disks 140A, 140B and 140C.

Figure 7:
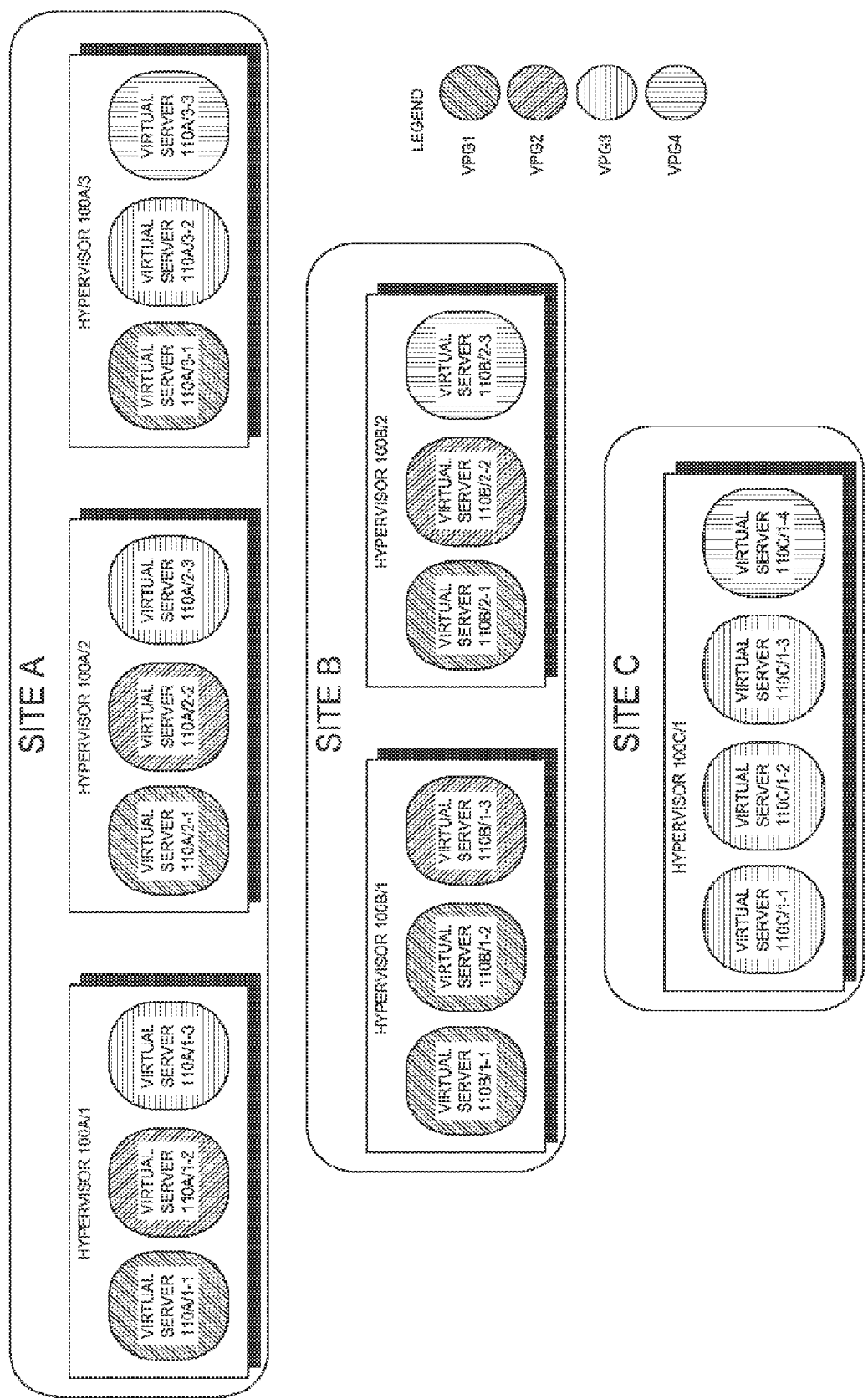
FIG. 7 is an example an environment for the system of FIG. 4, in accordance with an embodiment of the present invention.

The hypervisors are shown in system 300 with their respective VDSAs 160A/1, 160A/2, . . . , and the other components of the hypervisors, such as the virtual servers 110 and virtual disks 120, are not shown for the sake of clarity. An example system with virtual servers 110 is shown in FIG. 7, and described herein below.

The sites include respective data services managers 310A, 310B and 310C that coordinate hypervisors in the sites, and coordinate hypervisors across the sites.

The system of FIG. 4 may be used for data replication, whereby data at one site is replicated at one or more other sites, for protection. The solid communication lines 330 in FIG. 4 are used for in-site traffic, the dashed communication lines 340 are used for replication traffic between sites, and the dotted communication lines 350 are used for control traffic between data services managers.

Data services managers 310A, 310B and 310C are control elements. The data services managers at each site communicate with one another to coordinate state and instructions. The data services managers track the hypervisors in the environment, and track health and status of the VDSAs 160A/1, 160A/2, . . . .

It will be appreciated by those skilled in the art that the environment shown in FIG. 4 may be re-configured by moving one or more virtual servers 110 from one hypervisor 100 to another, by moving one or more virtual disks 120 from one hypervisor 100 to another, and by adding one or more additional virtual servers 110 to a hypervisor 100.

In accordance with an embodiment of the present invention, the data services managers enable designating groups of specific virtual servers 110, referred to as virtual protection groups, to be protected. For virtual protection groups, write order fidelity is maintained. The data services managers enable designating a replication target for each virtual protection group; i.e., one or more sites, and one or more hypervisors in the one or more sites, at which the virtual protection group is replicated. A virtual protection group may have more than one replication target. The number of hypervisors and virtual servers within a virtual protection group and its replication target are not required to be the same.

Reference is made to FIG. 5, which is a user interface screenshot of bi-directional replication of virtual protection groups, in accordance with an embodiment of the present invention. Shown in FIG. 4 are virtual protection groups 301 ("Exchange"), 302 ("WebApp"), 303 ("Dummy-R1"), 304 ("Windows 2003") and 305 (Dummies-L"). Arrows 306 indicate direction of replication.

Figure 6:
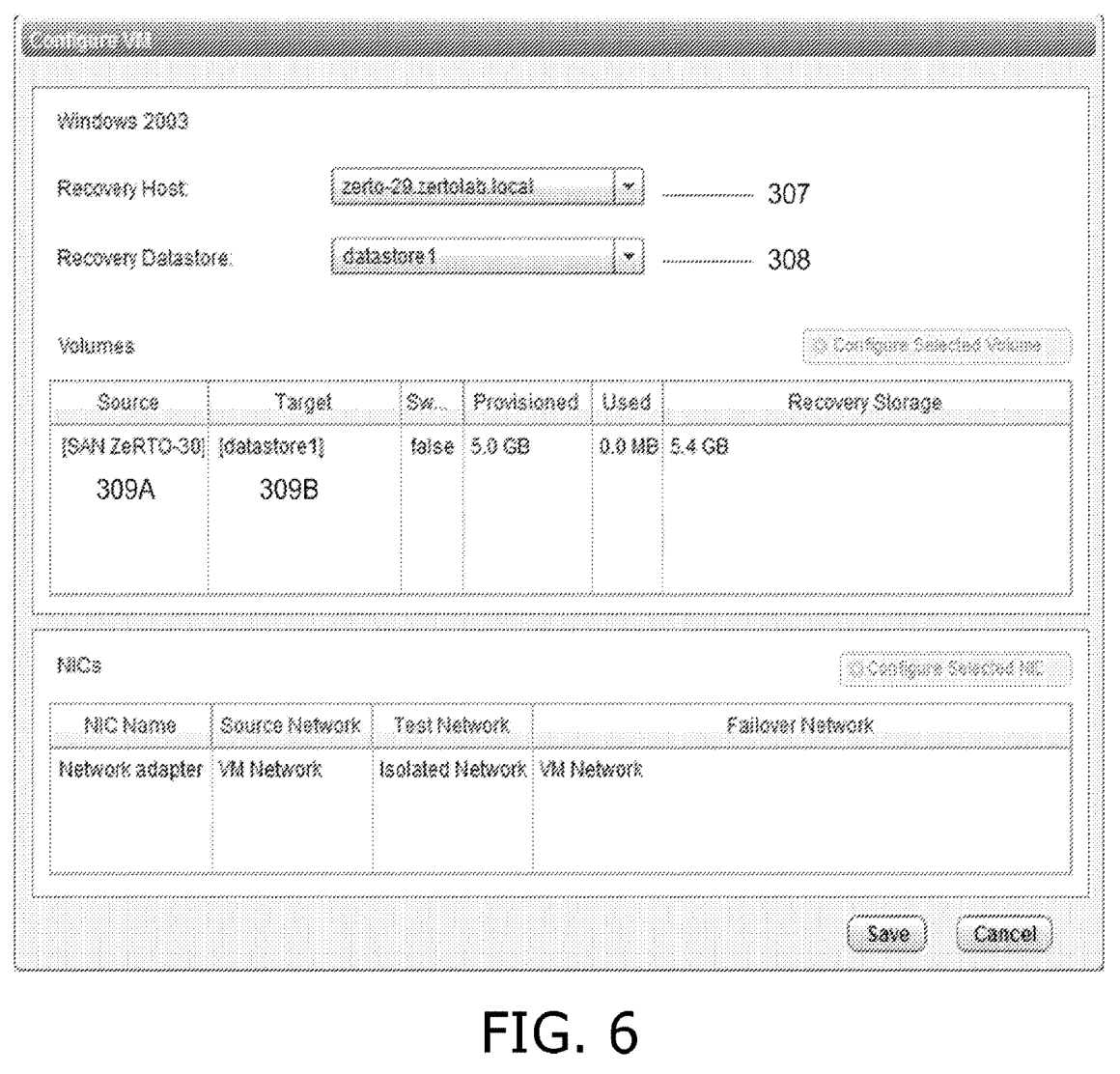

Reference is made to FIG. 6, which is a user interface screenshot of assignment of a replication target for a virtual protection group, in accordance with an embodiment of the present invention. Shown in FIG. 6 is an entry 307 for designating a recovery host, and an entry 308 for designating a recovery datastore for virtual protection group 304 ("Windows 2003") of FIG. 5. Respective source and target datastores, [SAN ZeRTO-30] 309A and [datastore1] 309B, are shown as being paired.

More generally, the recovery host may be assigned to a cluster, instead of to a single hypervisor, and the recovery datastore may be assigned to a pool of resources, instead of to a single datastore. Such assignments are of particular advantage when different enterprises share the same physical infrastructure for target replication, as such assignments mask the virtual infrastructure between the different enterprises.

The data services managers synchronize site topology information. As such, a target site's hypervisors and datastores may be configured from a source site.

Virtual protection groups enable protection of applications that run on multiple virtual servers and disks as a single unit. E.g., an application that runs on virtual servers many require a web server and a database, each of which run on a different virtual server than the virtual server that runs the application. These virtual servers may be bundled together using a virtual protection group.

Referring back to FIG. 4, data services managers 310A, 310B and 310C monitor changes in the environment, and automatically update virtual protection group settings accordingly. Such changes in the environment include inter alia moving a virtual server 110 from one hypervisor 100 to another, moving a virtual disk 120 from one hypervisor 100 to another, and adding a virtual server 110 to a hypervisor 100.

For each virtual server 110 and its target host, each VDSA 160A/1, 160A/2, . . . replicates IOs to its corresponding replication target. The VDSA can replicate all virtual servers to the same hypervisor, or to different hypervisors. Each VDSA maintains write order fidelity for the IOs passing through it, and the data services manager coordinates the writes among the VDSAs.

Since the replication target hypervisor for each virtual server 110 in a virtual protection group may be specified arbitrarily, all virtual servers 110 in the virtual protection group may be replicated at a single hypervisor, or at multiple hypervisors. Moreover, the virtual servers 110 in the source site may migrate across hosts during replication, and the data services manager tracks the migration and accounts for it seamlessly.

Reference is made to FIG. 7, which is an example an environment for system 300, in accordance with an embodiment of the present invention. As shown in FIG. 7, system 300 includes the following components.
Site A
Hypervisor 100A/1: virtual servers 110A/1-1, 110A/1-2, 110A/1-3.
Hypervisor 100A/2: virtual servers 110A/2-1, 110A/2-2, 110A/2-3.
Hypervisor 100A/3: virtual servers 110A/3-1, 110A/3-2, 110A/3-3.
Site B
Hypervisor 100B/1: virtual servers 110B/1-1, 110B/1-2, 110B/1-3.
Hypervisor 100B/2: virtual servers 110B/2-1, 110B/2-2, 110B/2-3.
Site C
Hypervisor 100C/1: virtual servers 110C/1-1, 110C/1-2, 110C/1-3, 110C/1-4.

As further shown in FIG. 7, system 300 includes the following virtual protection groups. Each virtual protection group is shown with a different hatching, for clarity.
VPG1 (shown with upward-sloping hatching)
  Source at Site A: virtual servers 110A/1-1, 110A/2-1, 110A/3-1
  Replication Target at Site B: virtual servers 110B/1-1, 110B/1-2, 110B/2-1
VPG2 (shown with downward-sloping hatching)
  Source at Site B: virtual servers 110B/1-3, 110B/2-2
  Replication Target at Site A: virtual servers 110A/1-2, 110A/2-2
  VPG3 (shown with horizontal hatching)
Source at Site A: virtual server 110A/3-3
  Replication Target at Site B: virtual serer 110B/2-3
  Replication Target at Site C: virtual server 110C/1-4
VPG4 (shown with vertical hatching)
  Source at Site A: virtual servers 110A/1-3, 110A/2-3, 110A/3-2
  Replication Target at Site C: virtual servers 110C/1-1, 110C/1-2, 110C/1-3

As such, it will be appreciated by those skilled in the art that the hypervisor architecture of FIG. 1 scales to multiple host sites, each of which hosts multiple hypervisors. The scaling flexibly allows for different numbers of hypervisors at different sites, and different numbers of virtual services and virtual disks within different hypervisors.

The scaling flexibility of the present invention also allows extension to cloud-based data services provided by a cloud provider on a shared infrastructure, as explained herein below.

Cloud-based data services enable data center providers to service multiple enterprises at data centers that are remote from the enterprises. Cloud-based data services offer many advantages. Enterprises that use cloud-based data services obviate the needs for servers, SAN/NAS, networks, communication lines, installation, configuration and ongoing maintenance of information technology systems, and overhead expenses for electricity, cooling and space. However, conventional cloud-based data suffer from weakness of security due to multiple enterprises sharing the same physical infrastructure, and due to multiple enterprises using the same networks and IPs for their services.

Figure 8:
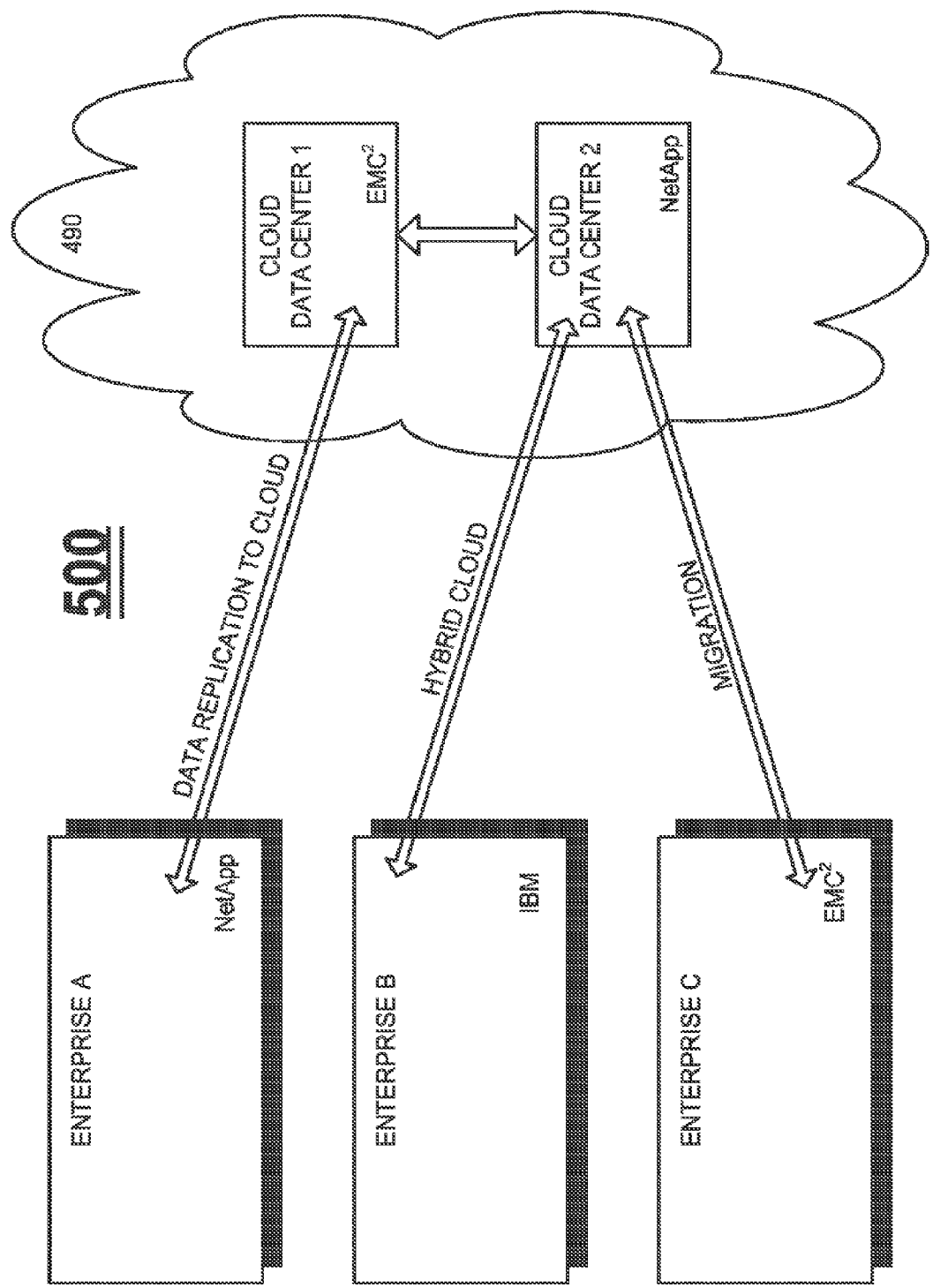
FIG. 8 is a simplified block diagram of a system for multi-tenant and multi-site cloud-based data services, in accordance with an embodiment of the present invention.

Cloud-based systems of the present invention overcome these weaknesses. Reference is made to FIG. 8, which is a simplified block diagram of a system 500 for multi-tenant and multi-site cloud-based data services, in accordance with an embodiment of the present invention. Shown in FIG. 8 are three enterprises, designated A, B and C, and a remote cloud-based facility 490 with two data centers, designated 1 and 2. Enterprise A uses a NETAPP® data management system, Enterprise B uses an IBM® data management system, and Enterprise C uses an $EMC^2$® data management system. Data Center 1 uses an $EMC^2$® data management system and services Enterprise A. Data Center 2 uses a NETAPP® data management system and services Enterprises B and C.

System 500 has many advantages over conventional data service systems. Inter alia, system 500 enables protection of heterogenic environments, enables remote control of enterprise sites, enables economies of scale, enables complete workload mobility, enables a complete web services API for seamless integration, and enables integration with other cloud-based management systems.

Figure 9:
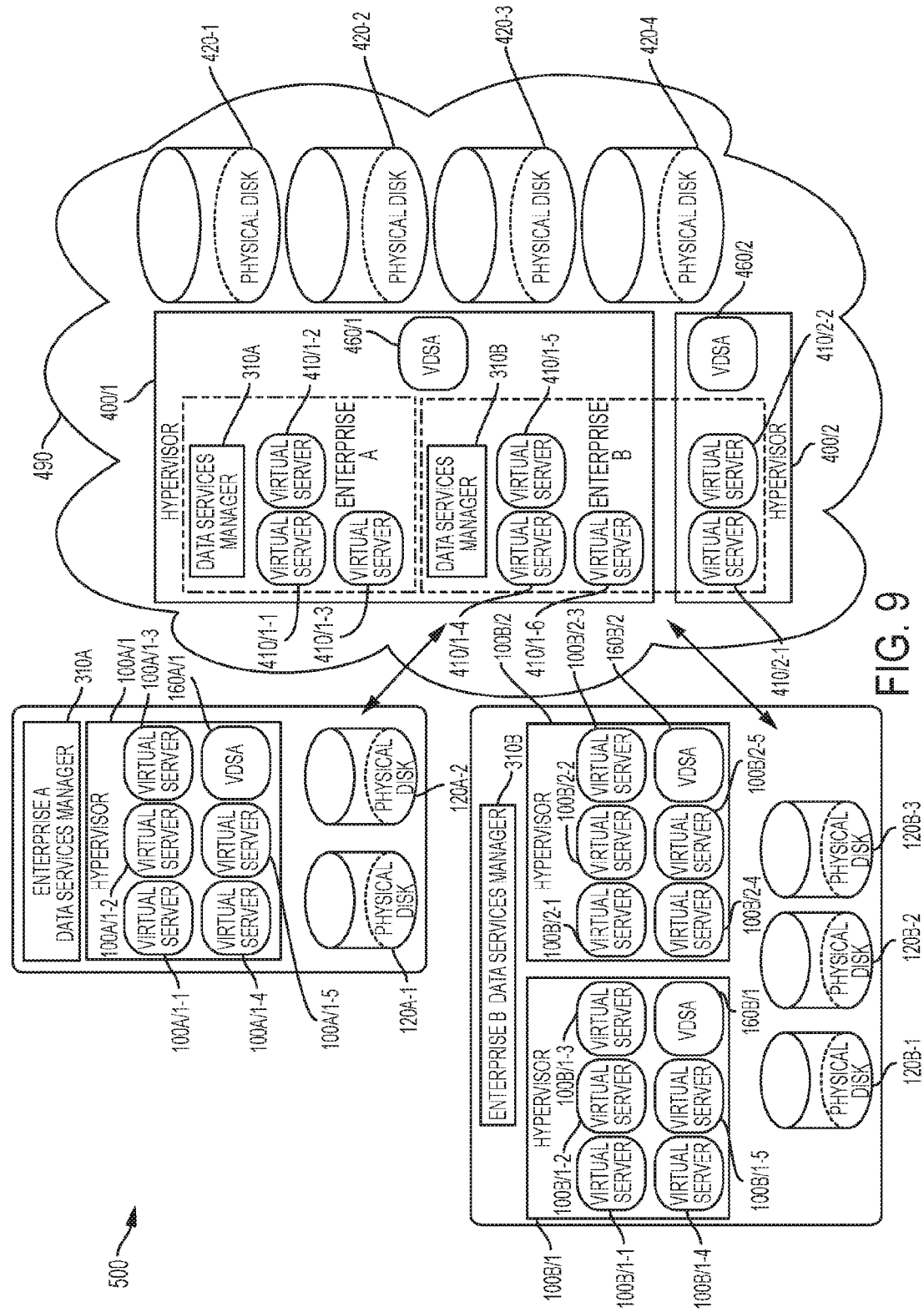
FIG. 9 is a simplified block diagram of a first architecture for providing hypervisor level multi-tenant cloud-based data services, in accordance with an embodiment of the present invention.

Reference is made to FIG. 9, which is a simplified block diagram of a first architecture of system 500 for providing hypervisor level multi-tenant cloud-based data services, in accordance with an embodiment of the present invention. The architecture shown in FIG. 9 includes two enterprises; namely, a smaller enterprise A and a larger enterprise B. Enterprise A infrastructure includes a single hypervisor 100A/1 with five virtual servers 100A/1-1, 100A/1-2, 100A/1-3, 100A/1-4 and 100A/1-5 and a VDSA 160A/1, includes two physical disks 120A-1 and 120A-2, and includes a data services manager 310A. Enterprise B infrastructure includes two hypervisors 100B/1 and 100B/2, includes three physical disks 120B-1, 120B-2 and 120B-3, and a data services manager 310B. Hypervisor 100B/1 includes five virtual servers 100B/1-1, 100B/1-2, 100B/1-3, 100B/1-4 and 100B/1-5 and a VDSA 160B/1; and hypervisor 100B/2 includes five virtual servers 100B/2-1, 100B/2-2, 100B/2-3, 100B/2-4 and 100B/2-5 and a VDSA 160B/2.

Cloud-based facility 490 infrastructure includes two hypervisors 400/1 and 400/2, and four physical disks 420-1, 420-2, 420-3 and 420-4. Hypervisor 400/1 includes six virtual servers 410/1-1, 410/1-2, 410/1-3, 410/1-4, 410/1-5 and 410/1-6; and hypervisor 400/2 includes two virtual servers 410/2-1 and 410/2-2. Hypervisor 400/1 services Enterprises A and B, and hypervisor 400/2 services Enterprise B. As such, the infrastructure of cloud-based facility 490 is shared between Enterprises A and B.

The architecture of FIG. 9 allocates one data services manager per enterprise and one VDSA per hypervisor. Specifically, hypervisor 400/1 includes a VDSA 460/1 and hypervisor 400/2 includes a VDSA 460/2. A data services manager 510A services Enterprise A, and a data services manager 510B services Enterprise B.

Figure 10:
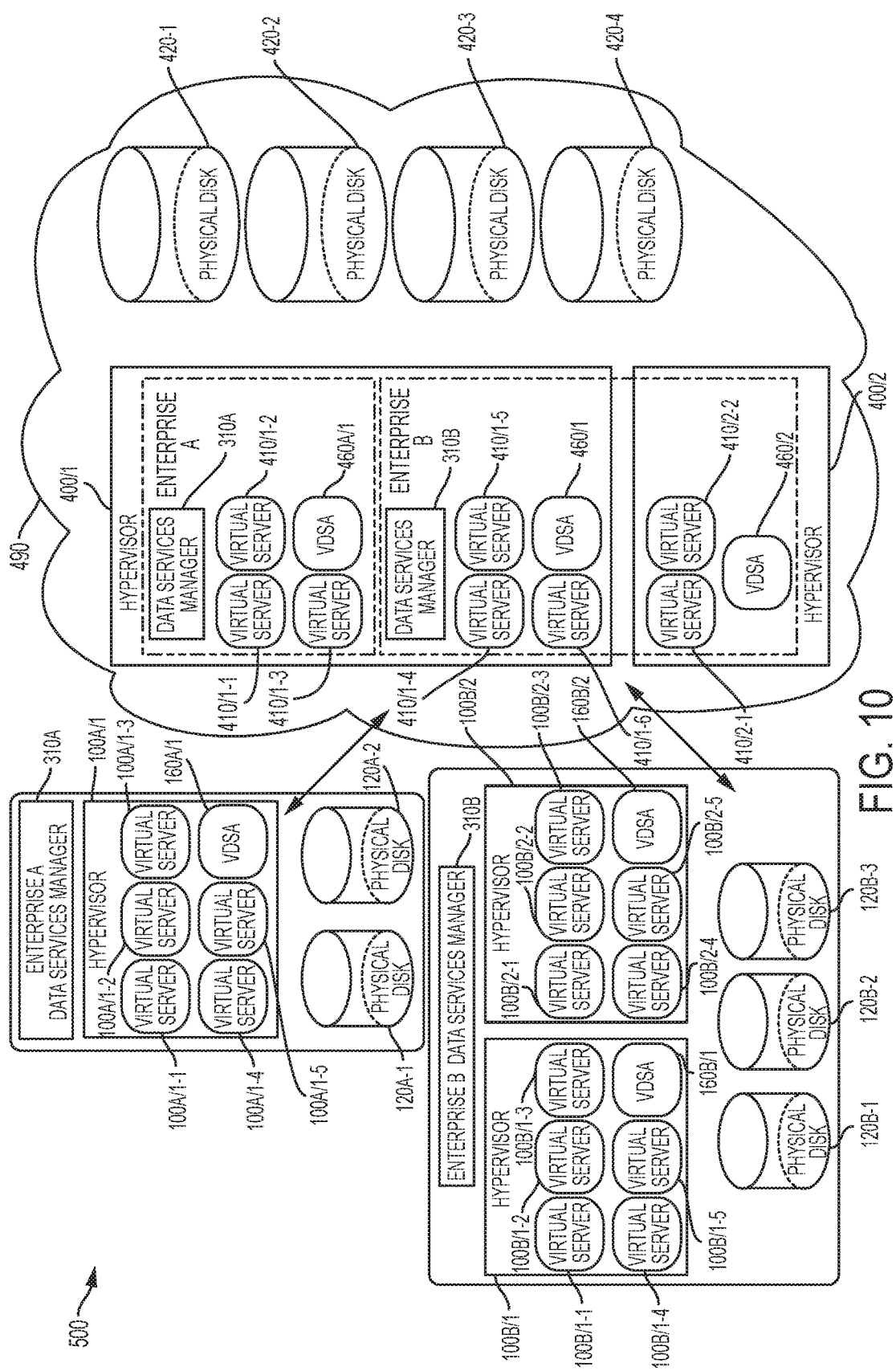
FIG. 10 is a simplified block diagram of a second architecture for providing hypervisor level multi-tenant cloud-based data services, in accordance with an embodiment of the present invention.

Reference is made to FIG. 10, which is a simplified block diagram of a second architecture of system 500 for providing hypervisor level multi-tenant cloud-based data services, in accordance with an embodiment of the present invention. The configuration of FIG. 10 allocates one data services manager per enterprise and one VDSA per enterprise per hypervisor. Specifically, hypervisor 400/1 includes a VDSA 460A/1 for Enterprise A and a VDSA 460B/1 for Enterprise B, and hypervisor 400/2 includes a VDSA 460B/2 for Enterprise B.

Figure 11:
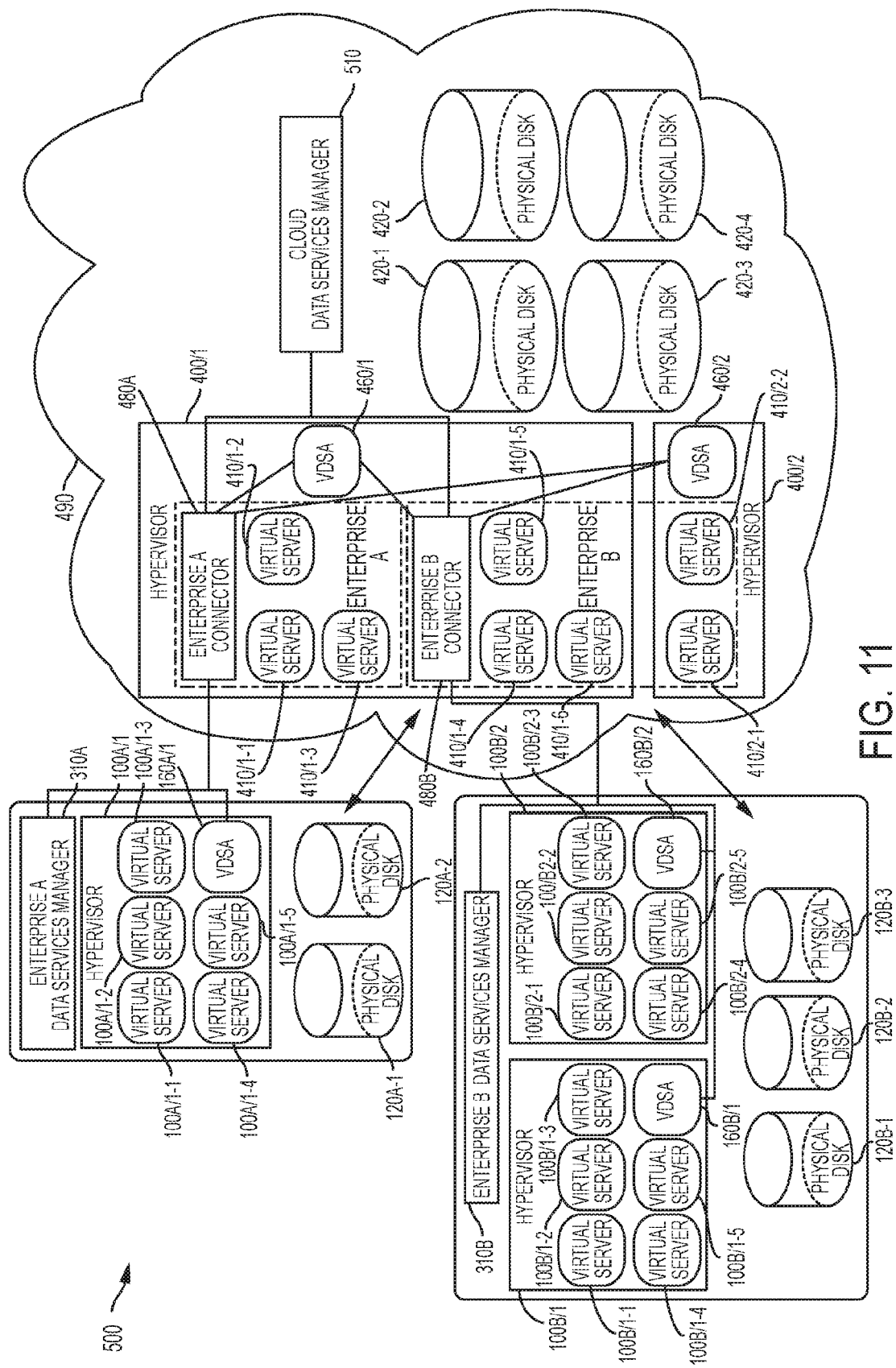
FIG. 11 is a simplified block diagram of a third architecture for providing hypervisor level multi-tenant cloud-based data services, in accordance with an embodiment of the present invention.

Reference is made to FIG. 11, which is a simplified block diagram of a third configuration of system 500 for providing hypervisor level multi-tenant cloud-based data services, in accordance with an embodiment of the present invention. The configuration of FIG. 12 allocates one data services manager in the cloud, and one VDSA per hypervisor. In addition, one enterprise connector is allocated per enterprise. Specifically, a connector 480A is allocated to Enterprise A, and a connector 480B is allocated to Enterprise B. Connector 480A is connected to both VDSA 460/1 and VDSA 460/2 and to a cloud data services manager 510 on the cloud side, and is connected to Enterprise A data services manager 310A and VDSA 160A/1 on the enterprise side. Similarly, connector 480B is connected to VDSA 460/1, VDSA 460/2 and cloud data services manager 510 on the cloud side, and is connected to Enterprise B data services manager 310B, VDSA 160B/1 and VDSA 160B/2 on the enterprise side. As such, each enterprise is connected to the entire infrastructure on the cloud side via its own connector.

Figure 12:
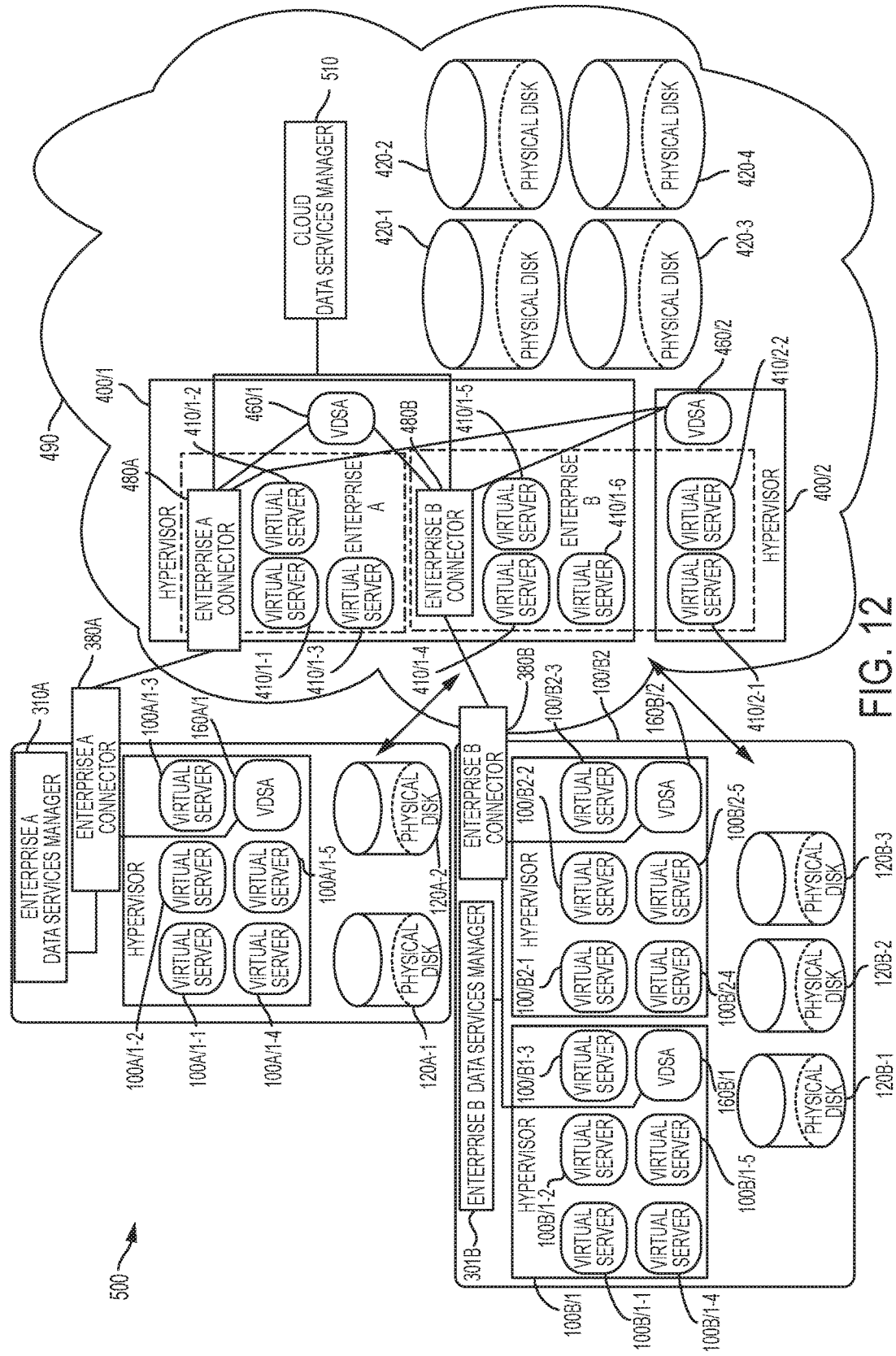
FIG. 12 is a simplified block diagram of a fourth architecture for providing hypervisor level multi-tenant cloud-based data services, in accordance with an embodiment of the present invention.

Reference is made to FIG. 12, which is a simplified block diagram of a fourth architecture of system 500 for providing hypervisor level multi-tenant cloud-based data services, in accordance with an embodiment of the present invention. The architecture of FIG. 12 also allocates one data services manager in the cloud, and one VDSA per hypervisor. In addition, one enterprise connector is allocated per enterprise. Connectors 480A and 480B on the cloud side are paired with respective connectors 380A and 380B on the enterprise side. Use of connectors 380A and 380B eliminates the need for a virtual private network (VPN), and enables installation of system 500 behind network address translators (NATs).

The different architectures in FIGS. 9-12 offer different advantages. The architecture of FIG. 9 minimizes the cloud footprint of the VDSA, by using a shared VDSA per hypervisor, and only one data services manager per enterprise. Specifically, the VDSA is shared between enterprises and security is enforced via the data services managers. In this architecture, the data services manager is duplicated per enterprise and centralized cloud management is lacking.

The architecture of FIG. 10 maximizes data path security for enterprises, but the cloud footprint is larger, since multiple data services managers may be required per hypervisor.

The architectures of FIGS. 11 and 12 provides data security, network security, minimal cloud footprint, and single point of control for cloud vendors. In this architecture, there is only one centralized data service manager on the cloud side, and only one VDSA per hypervisor. One cloud connector element is deployed on the cloud side, per enterprise. The cloud connector securely routes enterprise traffic from the enterprise network to the cloud infrastructure replication network, thus providing full network security and deployment features, including inter alia duplicate IP range utilization for different enterprises while maintaining unique network deployment on the cloud infrastructure side. The data services manager and VDSA's perform secure site authentication and data security, for end-to-end secure multi-tenant service.

As such, it will be appreciated by those skilled in the art that the cloud-based hypervisor level data services systems of the present invention enable multi-tenancy and multi-site services. I.e., multiple enterprises and multiple sites may be serviced by the same physical infrastructure including inter alia the same hypervisors and storage, with minimized footprint on the cloud side, allowing for centralized cloud management. By providing each enterprise with its own data services manager on the clod side, as in FIGS. 9 and 10, or alternatively with its own connector and a centralized data services manager on the cloud side, as in FIGS. 11 and 12, the systems of the present invention provide path separation between enterprises, thus ensuring that each enterprise is only able to view and access his own virtual servers and storage, and each enterprise can only control its own data replication.

By deploying additional cloud connectors on the enterprise side, as in FIG. 12, the systems of the present invention may be installed behind NATs, and do not require a VPN. As such, these systems may obviate VPN setups for enterprises, and obviate use of dedicated public IPs. For additional security, the cloud connectors encrypt traffic, thus eliminating the need for additional network security elements.

The systems of the present invention provide bi-directional cloud-based data replication services; i.e., from an enterprise to the cloud, and from the cloud to an enterprise, for the same enterprise or for different enterprises, simultaneously using the same shared infrastructure. Moreover, replication targets may be set as resources that do not expose the enterprise infrastructure, thus providing an additional layer of security and privacy between enterprises.

It will be appreciated by those skilled in the art that systems of the present invention may be used to enforce jurisdictional data export regulations. Specifically, cloud-based facility 490 infrastructure is partitioned according to jurisdictions, and data recovery and failover for an enterprise is limited to one or more specific partitions according to jurisdictional regulations.

Figure 13:
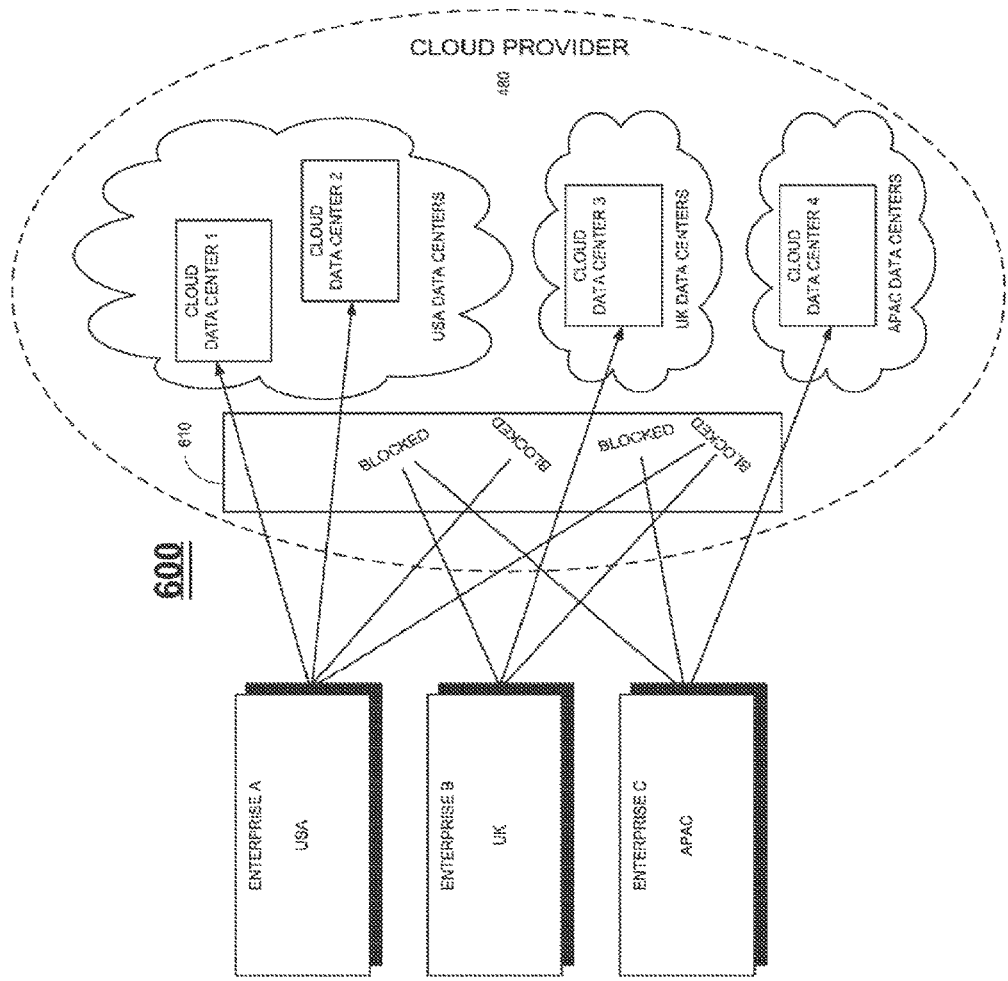
FIG. 13 is a simplified block diagram of a system for multi-tenant and multi-site cloud-based data services with jurisdictional data separation, in accordance with an embodiment of the present invention.

Reference is made to FIG. 13, which is a simplified block diagram of a system 600 for multi-tenant and multi-site cloud-based data services with jurisdictional data separation, in accordance with an embodiment of the present invention. Shown in FIG. 13 are three jurisdictional enterprises; namely, a USA Enterprise A, a UK Enterprise B, and an APAC Enterprise C. Also shown in FIG. 13 are four data centers; namely, Data Center 1 and Data Center 2 in the USA, Data Center 3 in the UK and Data Center 4 in APAC.

Privacy and data security regulations prevent data from being exported from one jurisdiction to another. In order to enforce these regulations, system 600 includes a rights manager 610 that blocks access to a data center by an enterprise if data export is regulations restrict data transfer between their respective jurisdictions. Thus rights manager 610 blocks access by Enterprise A to Data Centers 3 and 4, blocks access by Enterprise B to Data Centers 1, 2 and 4, and blocks access by Enterprise C to Data Centers 1, 2, and 3. Enterprises A, B and C may be commonly owned, but access of the data centers by the enterprises is nevertheless blocked, in order to comply with data export regulations.

In accordance with an embodiment of the present invention, when configuring a virtual protection group, an administrator may set a territory/data center restriction. When the administrator subsequently selects a destination resource for data replication for a virtual protection group, system 600 verifies that the resource is located in a geography that does not violate a territory/data center restriction.

The present invention provides built-in test capabilities, which enable an administrator to run multiples tests in parallel, to test recovery of data to multiple points in time. When a desired previous point in time is selected for testing by a disaster recovery system, each disk image is presented to the enterprise data applications, as the disk's data existed at the desired point in time. The data in the disk image corresponding to the desired point in time is generally determined from a replica disk and from an undo log of write commands. The replica disk generally corresponds to a disk image at a time later than the desired point in time. Some of the data in the replica disk may have been written prior to the desired point in time and some of the data may have been written subsequent to the desired point in time. For addresses to which data was written subsequent to the desired point in time, the undo journal may be used to undo the writes from the replica disk back to the desired point in time, to determine the disk image at the desired point in time. For addresses to which data was not written subsequent to the desired point in time, the data from the replica disk is used to determine the disk image at the desired point in time.

During recovery testing, all reads from a disk are directed to the disaster recovery system, which responds to the reads by providing the data for the disk image corresponding to the desired point in time. All writes to disks are recorded in a separate write log, so as to be able to erase them after the test is complete, thereby ensuring that production data is not affected by the recovery test.

There are many advantages to testing a previous point in time disk image, including ensuring that a replica is usable, and finding a safe point in time for recovery prior to a disaster.

The present invention enables running multiple recovery tests in parallel, at multiple points in time. When multiple points in time are selected for multiple tests, each test is redirected through a different processing stack, which reads data according to the appropriate point in time. Each test has its own write log. Each test may be stopped independently of the other tests. When a test is stopped, the test ends and is summarized and marked as pass or fail.

Figure 14:
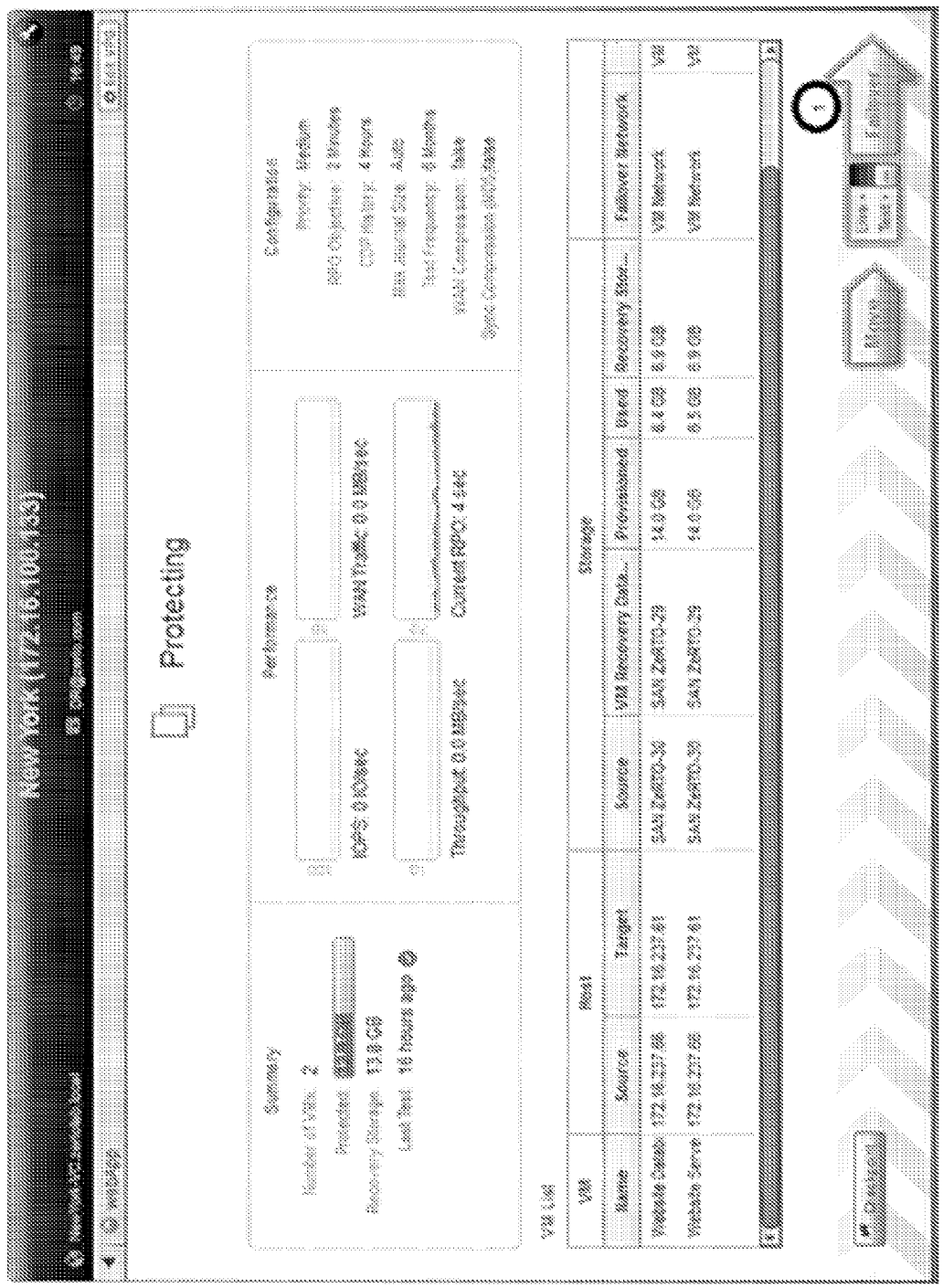
FIG. 14 is a user interface screenshot for initiating recovery tests for multiple points in time, in accordance with an embodiment of the present invention.

Reference is made to FIGS. 14-18, which are user interface screenshots of multiple points in time recovery testing, in accordance with an embodiment of the present invention. Shown in FIG. 14 is a user interface for performing recovery tests for multiple points in time, in accordance with an embodiment of the present invention. Clicking on the "Failover" control, marked with a circled 1, causes the recovery tests to be performed.

Figure 15:
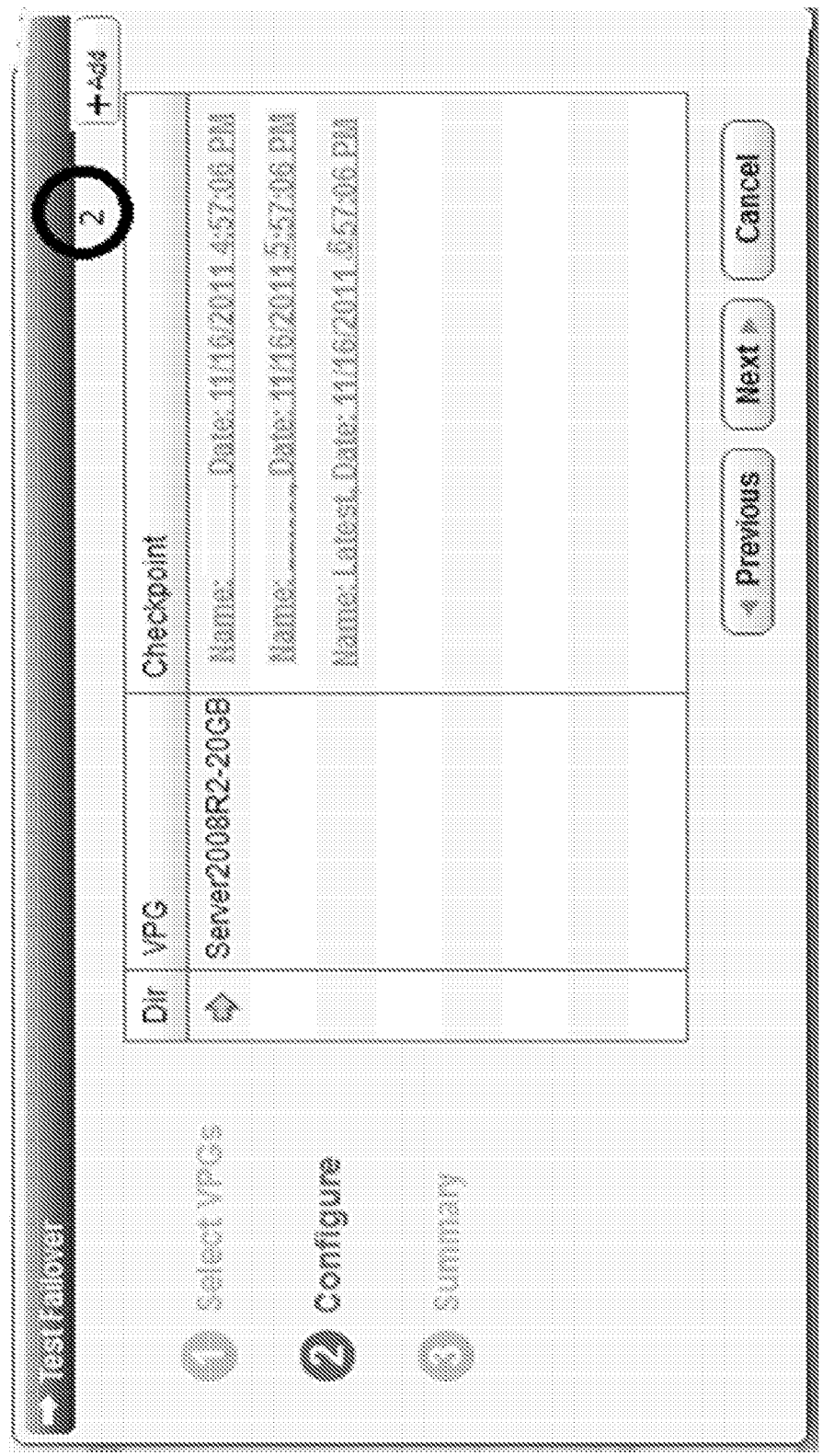
FIG. 15 is a user interface screenshot for configuring the multiple points in time, in accordance with an embodiment of the present invention.

Shown in FIG. 15 is a user interface for configuring the multiple points in time, in accordance with an embodiment of the present invention. FIG. 15 shows three recovery tests to be run in parallel for virtual protection group "Server2008R2-20 GB", for disk images at respective previous points in times 4:57:06 PM, 5:57:06 PM and 6:57:06 PM on Nov. 16, 2011.

Figure 16:
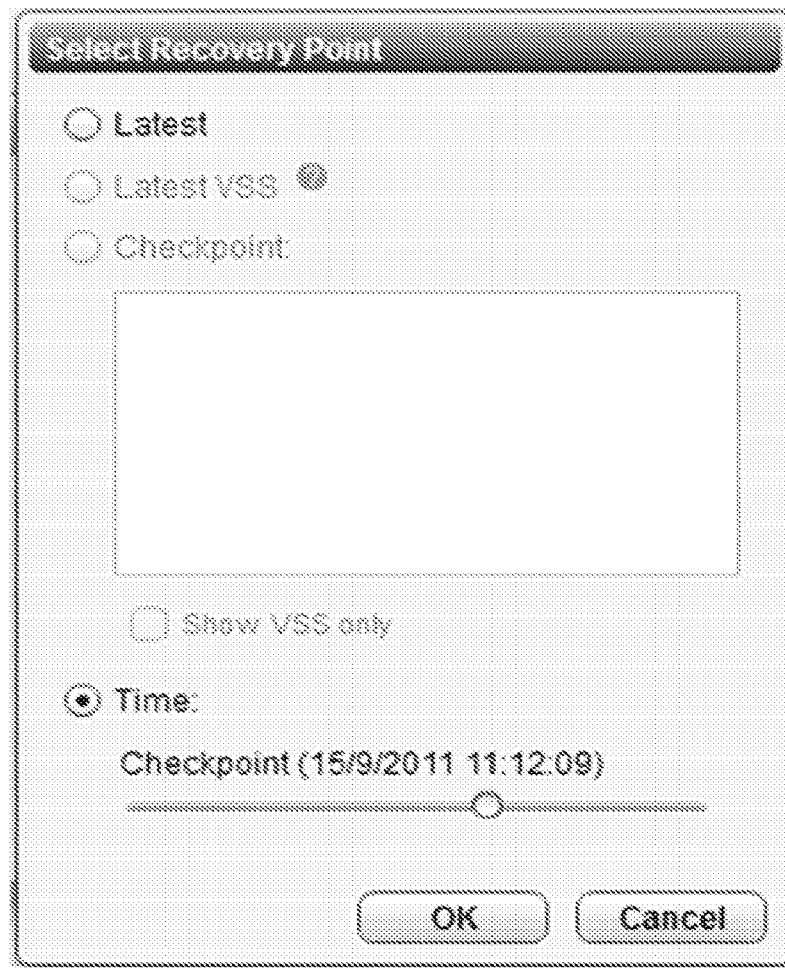
FIG. 16 is a user interface screenshot for designating a specific one of the multiple points in time, in accordance with an embodiment of the present invention.

Clicking on the "+Add" control, marked with a circled 2, causes the window shown in FIG. 16 to appear, for adding an additional point in time for testing data recovery.

Shown in FIG. 16 is a user interface for designating a specific one of the multiple points in time, in accordance with an embodiment of the present invention.

Figure 17:
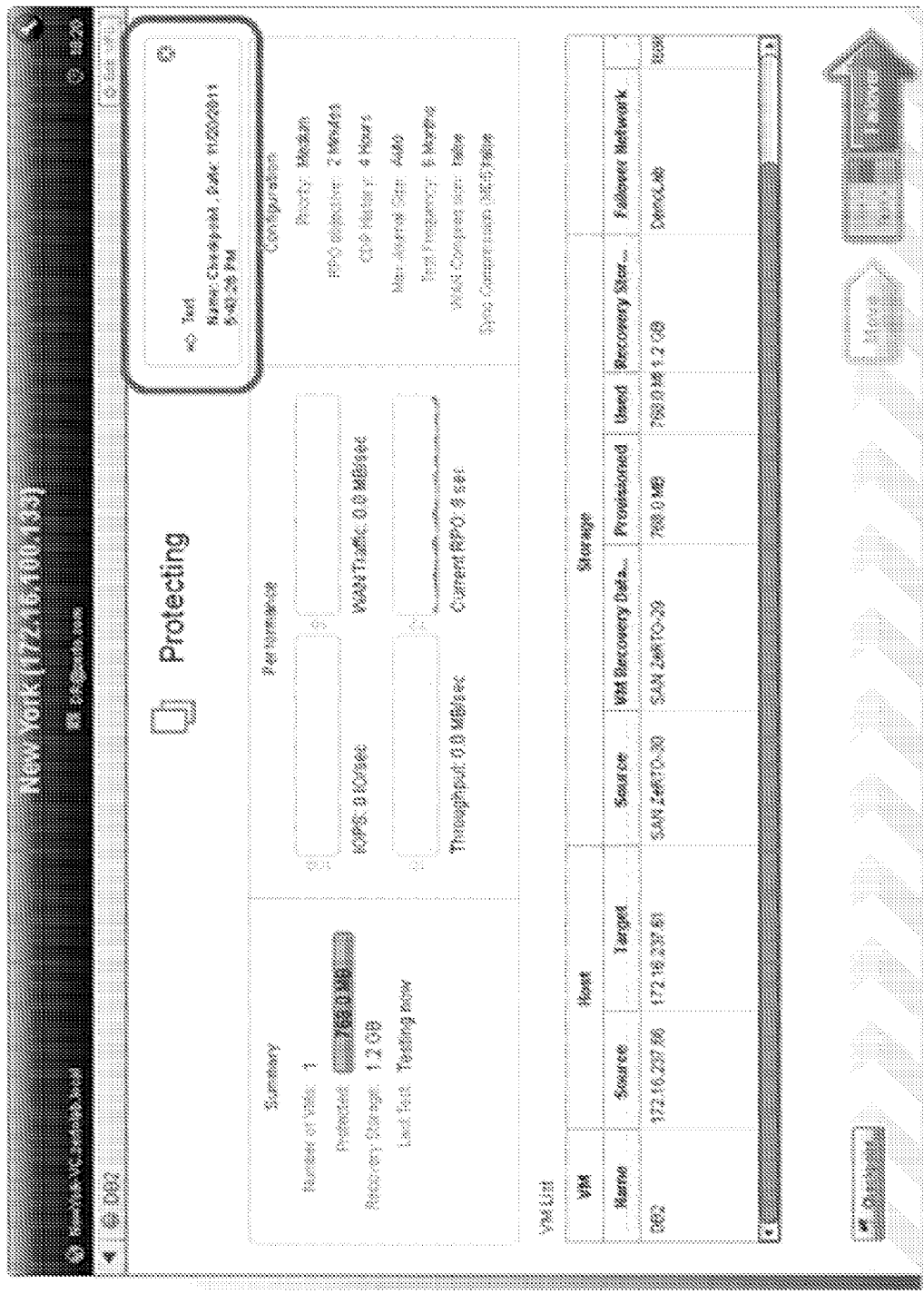
FIG. 17 is a user interface screenshot for stopping one or more of the recovery tests, in accordance with an embodiment of the present invention.

Shown in FIG. 17 is a user interface for stopping one or more of the recovery tests, in accordance with an embodiment of the present invention. Clicking on the "X" within the outlined area at the top right causes a test to stop, thereby ending the test.

Figure 18:
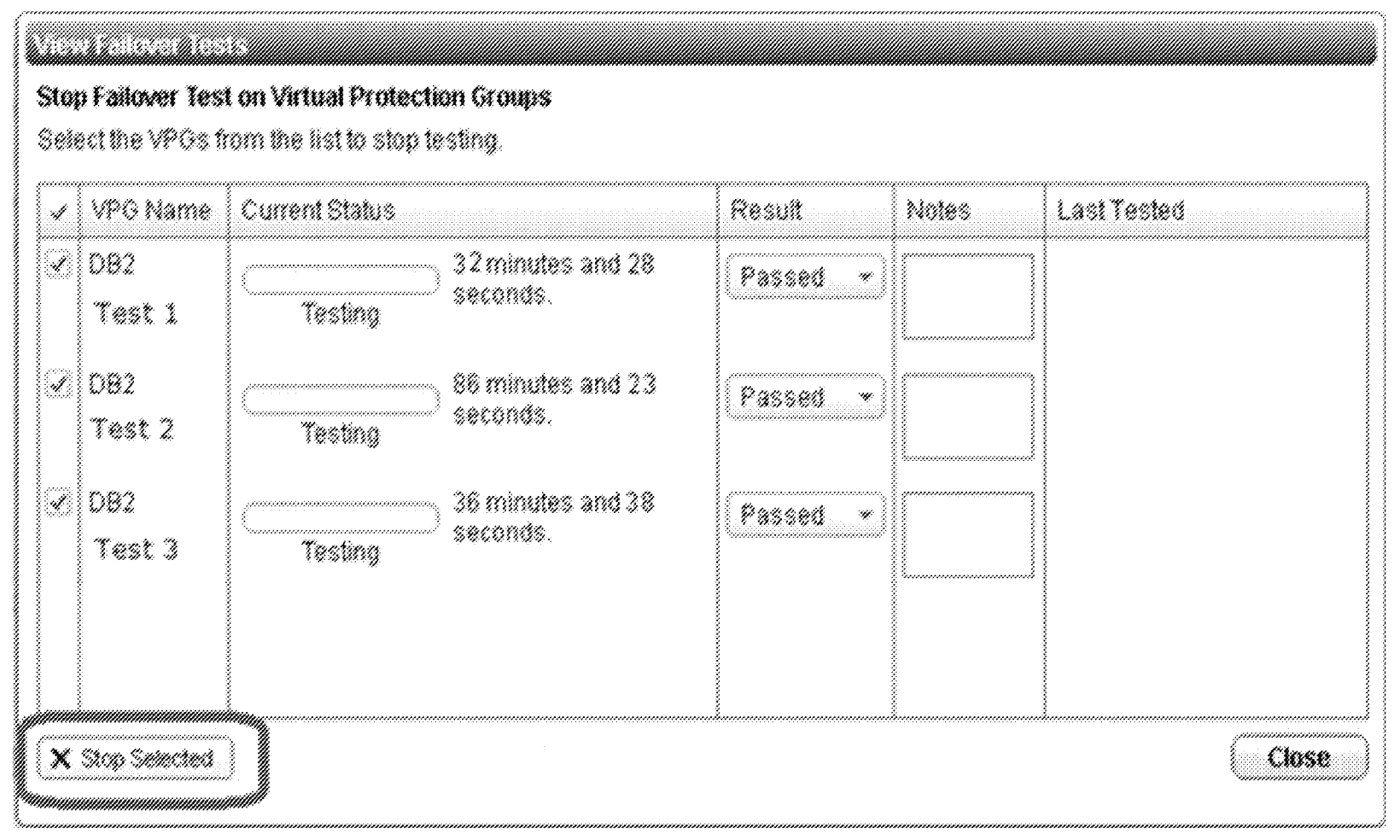

Shown in FIG. 18 is a user interface with a summary of the recovery tests, including the times at which the tests were stopped, in accordance with an embodiment of the present invention. FIG. 18 indicates that three tests were run, and stopped after respective times 32 minutes and 28 seconds, 86 minutes and 23 seconds, and 36 minutes and 38 seconds. All three tests passed.

Figure 19:
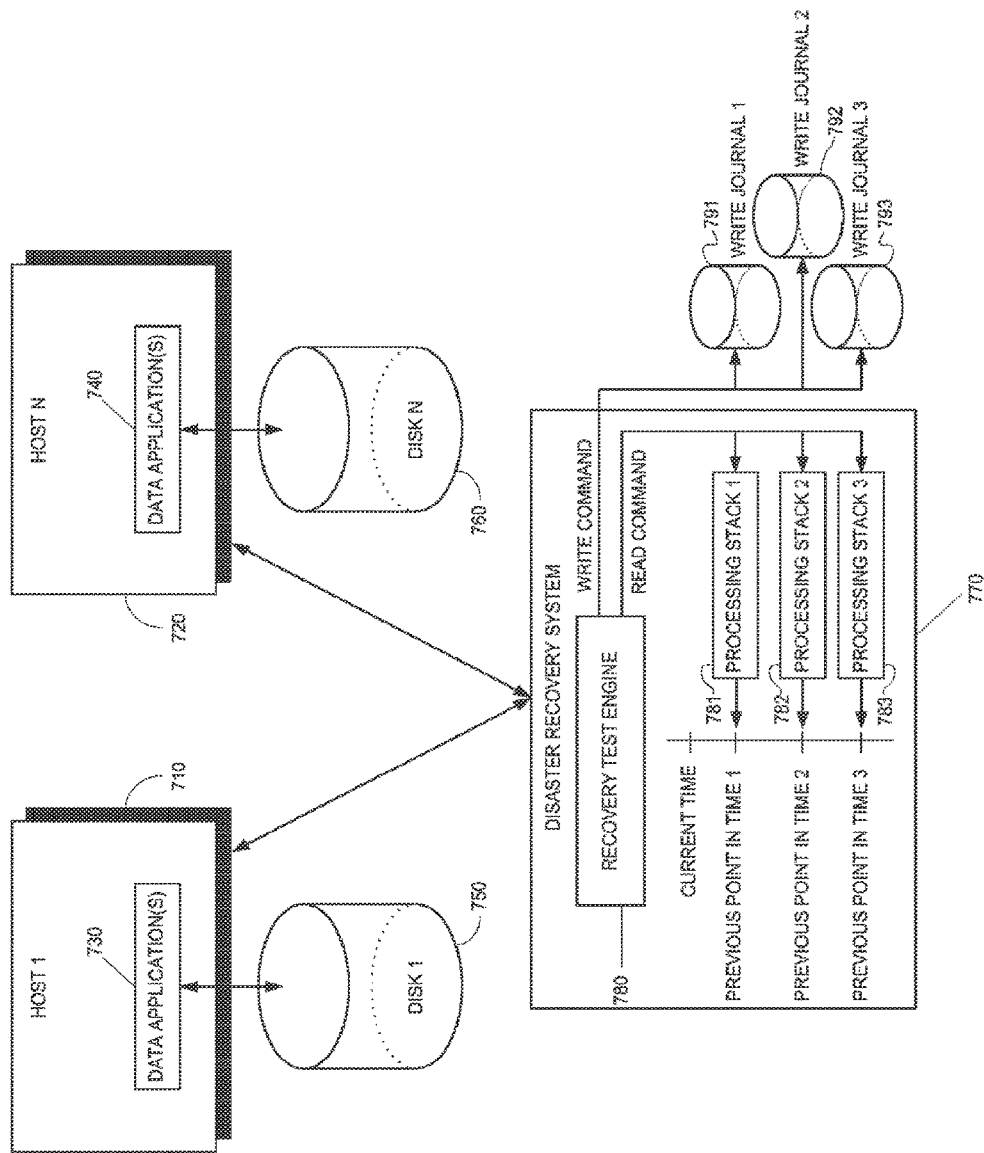
FIG. 19 is a simplified block diagram of a multiple point in time disaster recovery system, in accordance with an embodiment of the present invention.

Reference is made to FIG. 19, which is a simplified block diagram of a multiple points in time disaster recovery system, in accordance with an embodiment of the present invention. Shown in FIG. 19 are host sites 710 and 720 running respective data processing applications 730 and 740, which read data from and write data to respective disks 750 and 760. Disks 750 and 760 may be shared disks among the hosts.

A data recovery system 770 includes a recovery test engine 780, which enables simultaneous recovery testing of images of disks 750 and 760 at multiple points in time. As shown in FIG. 18, three tests are run simultaneously, corresponding to three respective previous points in time. In accordance with an embodiment of the present invention, recovery test engine 780 generates in parallel processing stacks 781, 782 and 783 for the three respective tests, each processing stack corresponding to one of the points in time at which the disk images are being recovered.

Processing stacks 781, 782 and 783 are each operative to receive a read command for a data address in one of the disks 750 and 760 issued by a data application, and to return data for the data address in the disk image as it existed at the point in time corresponding to the stack.

Recovery test engine 780 is operative to receive a write command for a data address in one of the disks 750 and 760, and log the write command in a temporary write journal 791, 792 or 793 corresponding to the point in time being tested. The write journals 791, 792 and 793 are generally discarded at the end of the recovery tests, thus ensuring that the recovery tests do not affect production data.

Figure 20:
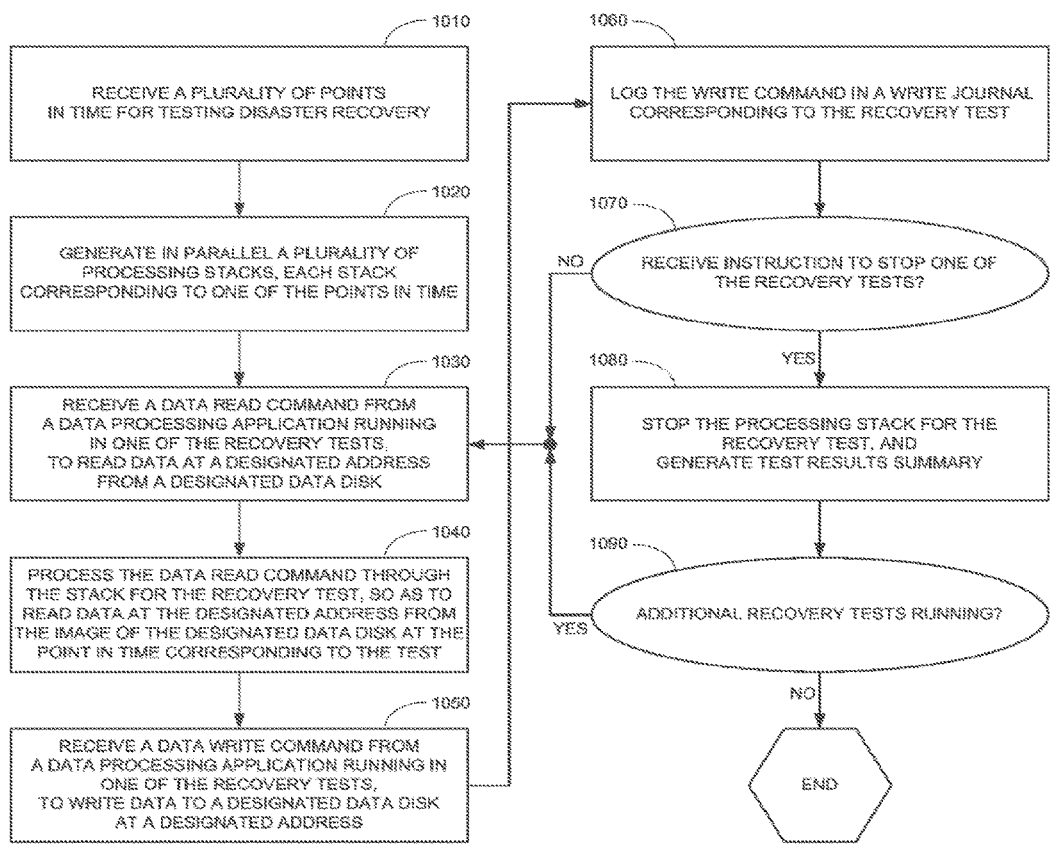
FIG. 20 is a simplified flowchart of a method for multiple points in time disaster recovery, in accordance with an embodiment of the present invention.

Reference is made to FIG. 20, which is a simplified flowchart of a method for multiple points in time disaster recovery, in accordance with an embodiment of the present invention. At operation 1010 a plurality of points in time, at which to perform a plurality of disaster recovery tests, are received. The points in time are generally designated by an administrator of a disaster recovery system. The recovery tests are operative to roll back data corresponding to disk images at the plurality of points in time, in order to check their suitability for safe recovery in case of a disaster.

At operation 1020 a plurality of processing stacks, such as processing stacks 781, 782 and 783 (FIG. 19) are generated in parallel, each processing stack corresponding to one of the points in time.

At operation 1030 a read command to read data at a designated address from a designated data disk, is received from a data processing application for one of the recovery tests. At operation 1040 the processing stack corresponding to the recovery test returns data at the designated address corresponding to the image of the designated disk at the point in time being tested.

At operation 1050 a write command to write data in a designated address of a designated data disk, is received from a data processing application for one of the recovery tests. At operation 1050, the write command is logged into a write journal used specifically for the recovery test, such as one of the write journals 791, 792 and 793.

At operation 1070 a determination is made if an instruction to stop one of the recovery tests is received. If not, then the method returns to operation 1030, to continue processing read and write commands. If so, then the processing stack for the recovery test is stopped at step 1080, thereby ending the test, and a summary of test results is generated. In one embodiment of the present invention, the summary is provided through the FailoverTestInfo data object listed in Appendix III.

At step 1090 a determination is made whether any remaining recovery tests are running. If so, the method returns to operation 1030 to continue processing read and write commands for the remaining recovery tests being performed. If not, then all tests have been stopped and the method ends.

It will thus be appreciated that the present invention enables parallel recovery testing of disk images at multiple points in time, thereby saving time and resources in performing multiple recovery tests vis-à-vis conventional recovery systems.

The present invention may be implemented through an application programming interface (API), exposed as web service operations. Reference is made to Appendices I-V, which define an API for virtual replication web services, in accordance with an embodiment of the present invention. The API for recovery tests for virtual protection groups is provided in Appendix III It will thus be appreciated that the present invention provides many advantages, including inter alia:
heterogeneous hypervisor replication, for different types of sources and target hypervisor; e.g., from a VMWare hypervisor to a Xen hypervisor;
heterogeneous storage replication, for different types of storage systems; e.g., from an EMC storage system to a NetApp storage systems;
bi-directional replication, whereby one enterprise may replicate from the enterprise to a cloud data center, while another enterprise simultaneously replicates from a cloud data center back to the enterprise; and
security, whereby the cloud infrastructure is not exposed.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An enterprise disaster recovery system, comprising:
a plurality of data disks;
at least one data application to run on a host computing device to read data from at least one data disk of the plurality of data disks and to write data to the at least one data disk over a period of time;
a recovery test engine to run on a recovery computing device to:
generate in parallel a plurality of processing stacks corresponding to a respective plurality of previous points in time within the period of time, each processing stack operative to process a read command to read data at a designated address from a designated data disk of the plurality of data disks and return data at the designated address in an image of the designated data disk at the previous point in time corresponding to the processing stack;

generate in parallel a plurality of write commands issued by the at least one data application to write data into designated addresses of designated data disks of the plurality of data disks; and log each write command received from the at least one data application into one of a plurality of write journals, each write journal corresponding to a respective previous point in time.

2. The system of claim 1, comprising the recovery test engine to stop operation of at least one processing stack of the plurality of processing stacks responsive to the receipt of a command to stop operation for the at least one processing stack.

3. The system of claim 1, comprising the recovery test engine to start operation of at least one processing stack of the plurality of processing stacks responsive to the receipt of a command to start operation for the at least one processing stack.

4. The system of claim 1, comprising the recovery test engine to receive the plurality of previous points in time via an administrative user interface.

5. The system of claim 1, comprising the recovery test engine to receive, from the at least one data application corresponding to one processing stack of the plurality of processing stacks, a read command to read data at the designated address from the designated data disk.

6. The system of claim 1, comprising the recovery test engine to process each processing stack of the plurality of processing stacks to return data at the designated address in an image of the designated data disk at the previous point in time corresponding to the processing stack.

7. The system of claim 1, comprising the recovery test engine to receive a write command from the at least one data application to write data in the designated address of the designated data disk for the corresponding processing stack and to log the write command into the one of the plurality of write journals for a corresponding point in time, the one of the plurality of write journals including a dedicated virtual disk.

8. The system of claim 1, comprising the recovery test engine to:
determine, responsive to stoppage of operation of a first processing stack of the plurality of processing stacks, that a second processing stack of the plurality of processing stacks is running; and
receive, from the second processing stack, responsive to the determination that the second processing stack is running, a read command to read data at the designated address from the designated data disk.

9. The system of claim 1, comprising the recovery test engine to stop operation of the plurality of processing stacks responsive to the determination that none of the plurality of processing stacks is running for a recovery test.

10. A method for testing enterprise disaster recovery, comprising:
receiving an arbitrarily designated plurality of points in time for conducting data recovery tests in parallel;
generating in parallel a plurality of processing stacks, each stack corresponding to one of the designated points in time, and each stack operative to receive a command issued by at least one data application to read data from a designated address from a designated data disk and to return data at the designated address in an image of the designated data disk at the designated point in time corresponding to the stack;
generating in parallel a plurality of write commands issued by the at least one data application to write data into designated addresses of designated data disks; and
logging the write commands received from the at least one data application into a plurality of write journals, each write journal corresponding to one of the designated points in time.

11. The method of claim 10, comprising stopping operation of any designated one of the stacks in response to receiving a command to stop operation of the designated stack.

12. The method of claim 10, comprising starting operation of at least one processing stack of the plurality of processing stacks responsive to receiving a command to start operation for the at least one processing stack.

13. The method of claim 10, comprising receiving, from the at least one data application corresponding to one processing stack of the plurality of processing stacks, a read command to read data at the designated address from the designated data disk.

14. The method of claim 10, comprising processing each processing stack of the plurality of processing stacks to return data at the designated address in an image of the designated data disk at the previous point in time corresponding to the processing stack.

15. The method of claim 10, comprising receiving a write command from the at least one data application to write data in the designated address of the designated data disk for the corresponding processing stack and to log the write command into one of the plurality of write journals for a corresponding point in time.

16. The method of claim 10, comprising generating in parallel the plurality of processing stacks, each stack operative to receive the command issued by at least one data application to read data from the designated address from the designated data disk of a server of a virtual protection group and to return data at the designated address in the image of the designated data disk of the server of the virtual protection group.

17. The method of claim 10, comprising:
determining, responsive to stopping operation of a first processing stack of the plurality of processing stacks, that a second processing stack of the plurality of processing stacks is running; and
receiving, from the second processing stack, responsive to determining that the second processing stack is running, a read command to read data at the designated address from the designated data disk.

18. The method of claim 10, comprising stopping operation of the plurality of processing stacks responsive to determining that none of the plurality of processing stacks is running for a recovery test.

19. The system of claim 1, wherein the recovery test engine stops operation of at least one processing stack of the plurality of processing stacks responsive to the receipt of a command to stop operation.

20. The system of claim 1, comprising a journal manager to:
receive the write commands from the at least one data application of a host site; and
log the write commands onto one of the plurality of write journals, the one of the plurality of write journals including a dedicated virtual disk.

* * * * *